(12) United States Patent
Sim et al.

(10) Patent No.: US 12,405,632 B2
(45) Date of Patent: Sep. 2, 2025

(54) DISPLAY DEVICE

(71) Applicant: Samsung Display Co., LTD., Yongin-si (KR)

(72) Inventors: Jin Yong Sim, Seongnam-si (KR); Jai Ku Shin, Hwaseong-si (KR); Sung Chul Choi, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 208 days.

(21) Appl. No.: 17/729,850

(22) Filed: Apr. 26, 2022

(65) Prior Publication Data

US 2023/0071578 A1 Mar. 9, 2023

(30) Foreign Application Priority Data

Sep. 3, 2021 (KR) .................. 10-2021-0117502

(51) Int. Cl.
*G06F 1/16* (2006.01)
(52) U.S. Cl.
CPC .......... *G06F 1/1643* (2013.01); *G06F 1/1616* (2013.01); *G06F 1/1656* (2013.01)
(58) Field of Classification Search
None
See application file for complete search history.

(56) References Cited

U.S. PATENT DOCUMENTS

| 10,461,268 B2 * | 10/2019 | Jiang .................. H10K 59/124 |
| 10,517,196 B2 * | 12/2019 | Chen .................. H05K 7/20954 |
| 10,755,991 B2 | 8/2020 | Park et al. |
| 11,406,044 B2 | 8/2022 | Wu et al. |
| 11,455,915 B2 | 9/2022 | Cho et al. |
| 2018/0335679 A1 | 11/2018 | Hashimoto et al. |
| 2020/0147932 A1 | 5/2020 | Baby et al. |
| 2020/0171784 A1 | 6/2020 | Hamburgen |
| 2020/0209998 A1 | 7/2020 | Shin et al. |
| 2021/0408445 A1 | 12/2021 | Sim et al. |
| 2022/0283671 A1 | 9/2022 | Sim et al. |
| 2022/0338381 A1 | 10/2022 | Wu et al. |
| 2022/0397969 A1 | 12/2022 | Sim et al. |
| 2023/0021348 A1 | 1/2023 | Cho et al. |

FOREIGN PATENT DOCUMENTS

| JP | 2018-043412 A | 3/2018 |
| KR | 10-2014-0125188 A | 10/2014 |
| KR | 10-2018-0036904 A | 4/2018 |
| KR | 10-2020-0016927 A | 2/2020 |
| KR | 10-2020-0019000 A | 2/2020 |

(Continued)

OTHER PUBLICATIONS

PCT International Search Report dated Dec. 29, 2022, issued in corresponding PCT Patent Application No. PCT/KR2022/013220 (9 pages).

*Primary Examiner* — Anthony Q Edwards
*Assistant Examiner* — Rashen E Morrison
(74) *Attorney, Agent, or Firm* — Womble Bond Dickinson (US) LLP

(57) ABSTRACT

A display device includes: a display module; a plate attached to the display module; and a digitizer on a lower portion of the plate. The plate is multi-layered, and includes: a layer with an isotropic elasticity coefficient; and a layer with an anisotropic elasticity coefficient.

24 Claims, 26 Drawing Sheets

(56) References Cited

FOREIGN PATENT DOCUMENTS

| | | |
|---|---|---|
| KR | 10-2020-0070336 A | 6/2020 |
| KR | 10-2021-0034720 A | 3/2021 |
| KR | 10-2021-0073253 A | 6/2021 |
| KR | 10-2022-0126326 A | 9/2022 |
| KR | 10-2022-0167843 A | 12/2022 |

* cited by examiner

DISPLAY DEVICE

CROSS-REFERENCE TO RELATED APPLICATION

This application claims priority to and the benefit of Korean Patent Application No. 10-2021-0117502, filed in the Korean Intellectual Property Office on Sep. 3, 2021, the entire content of which is incorporated by reference herein.

BACKGROUND

1. Field

Aspects of embodiments of the present disclosure relate to a display device, and more particularly, to a foldable display device.

2. Description of the Related Art

As information technology develops, importance of display devices that are a connection media between users and information is highlighted.

Recently, research and development on foldable display devices, bendable display devices, or rollable display devices using merits of bendable or foldable flexible display panels are progressed. The display devices are applicable to various fields of suitable electronic products, such as televisions or monitors, as well as suitable portable electronic devices and wearable devices.

The portable electronic devices, for example, such as smartphones or tablet PCs, are recently becoming lighter and slimmer for the purpose of ease of portability, and are developed in various ways for the purpose of convenient use. Particularly, the foldable electronic device including a flexible display may provide a relatively wider screen when compared to a bar-type electronic device, and the size of such foldable electronic device may be reduced when it is folded. Accordingly, such a foldable electronic device may provide increased portability, and has gained the spotlight as an electronic device that satisfies consumers' taste.

The above information disclosed in this Background section is for enhancement of understanding of the background of the present disclosure, and therefore, it may contain information that does not constitute prior art.

SUMMARY

One or more embodiments of the present disclosure are directed to a foldable display device.

According to one or more embodiments of the present disclosure, a display device includes: a display module; a plate attached to the display module; and a digitizer on a lower portion of the plate. The plate is multi-layered, and includes: a layer with an isotropic elasticity coefficient; and a layer with an anisotropic elasticity coefficient.

In an embodiment, the layer with the anisotropic elasticity coefficient of the plate may include carbon fiber reinforced plastic, the carbon fiber reinforced plastic including carbon fibers extending in one direction.

In an embodiment, the layer with the anisotropic elasticity coefficient of the plate may have a difference between an elasticity coefficient in a first direction and an elasticity coefficient in a second direction that is perpendicular to the first direction of 2 to 20 times from each other.

In an embodiment, the layer with the isotropic elasticity coefficient of the plate may include glass fiber reinforced plastic including glass fibers that are regularly arranged.

In an embodiment, the plate may include: a first layer; a second layer; and a third layer, and the first layer and the third layer may include the same material as each other and may have the anisotropic elasticity coefficient, and the second layer may have the isotropic elasticity coefficient.

In an embodiment, the display device may further include: a first auxiliary layer contacting the first layer, and located on a first outermost side of the plate; and a second auxiliary layer contacting the third layer, and located on a second outermost side of the plate opposite the first outermost side, and the first auxiliary layer and the second auxiliary layer may include one or more metals.

In an embodiment, the display device may further include: a first auxiliary layer located between the first layer and the second layer; and a second auxiliary layer located between the third layer and the second layer, and the first auxiliary layer and the second auxiliary layer may include one or more metals.

In an embodiment, the plate may include: a first layer; a second layer; and a third layer. The first layer and the third layer may include the same material as each other and may have the isotropic elasticity coefficient, and the second layer may have the anisotropic elasticity coefficient.

In an embodiment, the display device may further include: a first auxiliary layer contacting the first layer, and located on a first outermost side of the plate; and a second auxiliary layer contacting the third layer, and located on a second outermost side of the plate opposite the first outermost side, and the first auxiliary layer and the second auxiliary layer may include one or more metals.

In an embodiment, the display device may further include: a first auxiliary layer located between the first layer and the second layer; and a second auxiliary layer located between the third layer and the second layer, and the first auxiliary layer and the second auxiliary layer may include one or more metals.

In an embodiment, a thickness of the plate may be 150 μm to 250 μm. \

In an embodiment, a thickness of the layer with the anisotropic elasticity coefficient of the plate may be 100 μm to 150 μm.

In an embodiment, a thickness of the layer with the isotropic elasticity coefficient of the plate may be 10 μm to 50 μm.

In an embodiment, the display device may be configured to be folded relative to a folding axis.

In an embodiment, the plate may include: a folding area overlapping with the folding axis, and having a plurality of holes; and a peripheral folding area that may not overlap with the folding axis.

In an embodiment, the folding area and the peripheral folding area may be configured to be bent in opposite directions from each other.

In an embodiment, the layer with the anisotropic elasticity coefficient of the plate may have an elasticity coefficient that is perpendicular to the folding axis and an elasticity coefficient that is parallel to the folding axis, and the elasticity coefficient that is perpendicular to the folding axis may be less than the elasticity coefficient that is parallel to the folding axis.

In an embodiment, the layer with the anisotropic elasticity coefficient of the plate may have a difference between the elasticity coefficient that is perpendicular to the folding axis and the elasticity coefficient that is parallel to the folding axis of 1.5 to 6 times from each other.

According to one or more embodiments of the present disclosure, a foldable display device includes: a display module configured to be folded relative to a folding axis; and a plate attached to the display module. An elasticity coefficient of the plate in a direction that is perpendicular to the folding axis is less than an elasticity coefficient of the plate in a direction that is parallel to the folding axis.

In an embodiment, the plate may have a multilayered structure, and may include: a carbon fiber reinforced plastic layer including carbon fibers extending in one direction; and a glass fiber reinforced plastic layer including glass fibers that are arranged in a regular direction.

In an embodiment, the plate may include: a first layer; a second layer; and a third layer. The first layer and the third layer may have anisotropic elasticity coefficients, and the second layer may have an isotropic elasticity coefficient; or the first layer and the third layer may have isotropic elasticity coefficients, and the second layer may have an anisotropic elasticity coefficient.

In an embodiment, the plate may include: a folding area overlapping with the folding axis, and having a plurality of holes; and a peripheral folding area that may not overlap with the folding axis, and having a uniform thickness.

In an embodiment, the folding area and the peripheral folding area of the plate may be configured to be bent in opposite directions from each other.

In an embodiment, the foldable display device may further include: a cover window on the display module; and a digitizer located below the plate, and including: a first digitizer located at a left side relative to the folding axis; and a second digitizer located at a right side relative to the folding axis.

According to one or more embodiments of the present disclosure, a foldable display device that may be easily folded may be provided.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
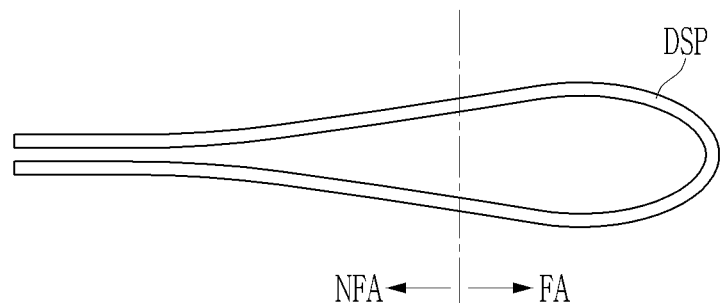
FIG. 1 shows a side view of a display panel according to one or more embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

As used herein, the phrase "in a plan view" refers to a view of an object portion from the top, and the phrase "in a cross-sectional view" refers to a view of a cross-section of an object portion that is vertically cut from the side.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
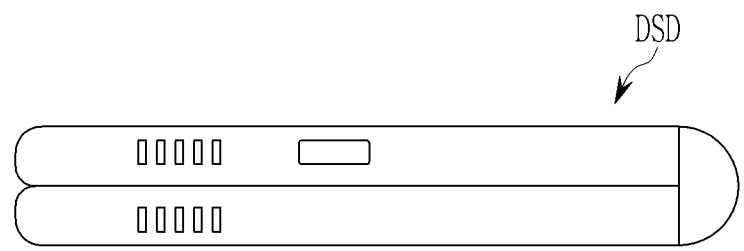
FIG. 2 shows a side view of a display device including the display panel of FIG. 1.

FIG. 1 and FIG. 2 show a display device according to one or more embodiments of the present disclosure. FIG. 2 shows a side view of a display device (DSD) according to one or more embodiments of the present disclosure, and FIG. 1 shows a side view of a display panel (DSP) included at an inside of the display device (DSD) shown in FIG. 2.

Referring to FIG. 2, the display device (DSD) according to the present embodiment is a foldable display device. As shown in FIG. 2, the display device (DSD) may be completely folded with no separation space therebetween. As shown in FIG. 2, in order for the display device (DSD) to be completely folded, the display panel (DSP) positioned in the display device (DSD) may be bent, for example, like the shape shown in FIG. 1.

In other words, as shown in FIG. 1, the display panel (DSP) includes a folding area (FA) and a peripheral folding area (NFA). A direction in which the folding area (FA) is bent may be different from a direction in which the peripheral folding area (NFA) is bent.

In other words, when the direction in which the folding area (FA) is bent is defined to be a forward direction, the peripheral folding area (NFA) may be bent in a reverse direction. As the display panel (DSP) is folded in the forward direction and the reverse direction depending on the areas as described above, the display device (DSD) may be completely folded as shown in FIG. 2.

Figure 3:
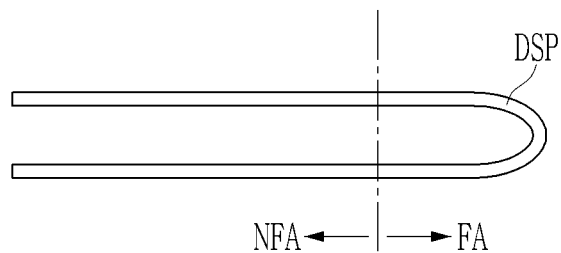
FIG. 3 shows a side view of a display panel bent in one direction.
Figure 4:
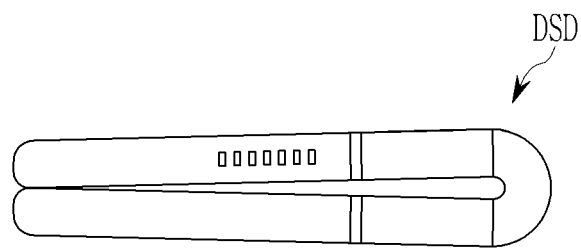
FIG. 4 shows a side view of a display device including the display panel of FIG. 3.

FIG. 3 shows a side view of a display panel (DSP) bent in one direction. FIG. 4 shows a side view of a display device including the display panel of FIG. 3.

Referring to FIG. 3, the folding area (FA) of the display panel (DSP) shown in FIG. 3 is bent in the forward direction, and the peripheral folding area (NFA) is not bent. As shown in FIG. 4, the display device (DSD) including the display panel (DSP) of FIG. 3 may not be completely folded, such that there may be a gap therebetween. When the gap is positioned therebetween, dust may penetrate inside depending on a use condition. When an impact is applied to the display device (DSD) by the gap between the folded display device (DSD), the display device (DSD) may be damaged.

However, according to one or more embodiments of the present disclosure, as the display panel (DSP) may be folded in the forward direction and the reverse direction depending on positions as shown in FIG. 1, the display device (DSD) may be completely folded as shown in FIG. 2. Therefore, the durability of the display device (DSD) may be increased, and the use environment thereof may be improved.

Figure 5:
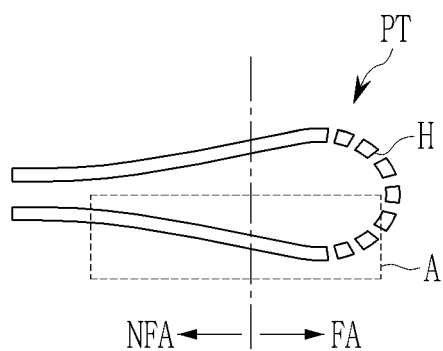
FIG. 5 shows a side view of a plate included in a display panel according to one or more embodiments of the present disclosure.

FIG. 5 shows a side view of a plate (PT) included in a display panel (DSP) according to one or more embodiments of the present disclosure. As described in more detail below, the plate (PT) may be adhered to a suitable component of the display device (e.g., the display panel (DSP)) through a display module (e.g., which may include the display panel (DSP)) and an adhesive layer to support the display module, and may help with bending of the display device. Referring to FIG. 5, the plate (PT) according to the present embodiment includes a folding area (FA), a peripheral folding area (NFA), and a plurality of holes (H) positioned in the folding area (FA). The folding area (FA) may be bent in the forward direction by the holes (H). A curvature radius by which the folding area (FA) is bent may be about 2 mm to 3 mm. However, the present disclosure is not limited thereto.

Referring to FIG. 5, the peripheral folding area (NFA) may be bent in an opposite direction (e.g., the reverse direction) of the direction in which the folding area (FA) is bent. The curvature radius by which the peripheral folding area (NFA) is bent may be greater than the curvature radius by which the folding area (FA) is bent. In more detail, the curvature radius by which the peripheral folding area (NFA) is bent may be about 20 mm to 30 mm. However, the present disclosure is not limited thereto.

For example, a difference between the curvature radius by which the folding area (FA) is bent and the curvature radius by which the peripheral folding area (NFA) is bent may be about 5 times to 20 times. In other words, the folding area (FA) may be bent with a smaller curvature radius to completely fold the display panel (DSP) in half, and the peripheral folding area (NFA) may be bent with a greater curvature radius in the opposite direction from that of the folding area (FA) to remove or reduce the gap between the folded display panel (DSP).

Figure 6:
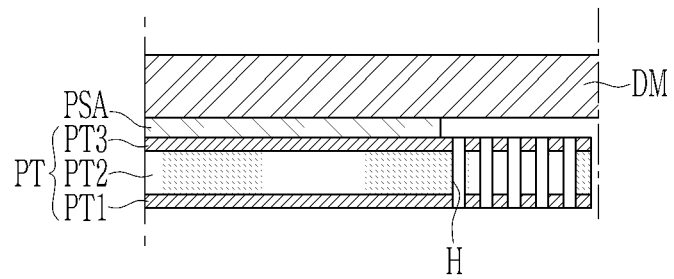
FIG. 6 shows a cross-sectional view of a display device including the plate of FIG. 5.

FIG. 6 shows a cross-sectional view of a display device (DSD) including the plate (PT) of FIG. 5. FIG. 6 shows a cross-section of the display device (DSD) corresponding to the portion A shown in FIG. 5.

Referring to FIG. 6, the display device (DSD) includes a display module (e.g., a display layer) (DM) (which may include the display panel (DSP)), and a plate (PT) attached to the display module (DM) through an adhesive layer (PSA). The plate (PT) may have a multilayered structure including a first layer (PT1), a second layer (PT2), and a third layer (PT3). A plurality of holes (H) may be positioned in the folding area (FA) of the plate (PT). Therefore, the plate (PT) and the display panel (DSP) including the plate may be bent to realize the foldable display device (DSD).

The first layer (PT1) and the third layer (PT3) of the plate (PT) may include the same or substantially the same material as each other. The second layer (PT2), which is positioned (e.g., interposed) between the first layer (PT1) and the third layer (PT3), may include a different material from those of the first layer (PT1) and the third layer (PT3).

The plate (PT) may have an odd-number of layers. In other words, the layers that are positioned at the outermost sides, respectively, of the plate (PT) may include the same or substantially the same material as each other.

As will be described in more detail below, the first layer (PT1) and the third layer (PT3) may be made of one or more suitable materials in which elasticity coefficients thereof have different anisotropic properties according to directions, and the second layer (PT2) may be made of a suitable material in which the elasticity coefficient thereof has the same or substantially the same isotropic property according to the directions. In another way, the first layer (PT1) and the third layer (PT3) may include one or more suitable materials in which the elasticity coefficients thereof have the same or substantially the same isotropic properties according to the directions, and the second layer (PT2) may include a suitable material in which the elasticity coefficient thereof has different anisotropic properties according to the directions.

When the plate (PT) has a stacked structure of various suitable materials with the isotropic elasticity coefficient/the anisotropic elasticity coefficient, the display panel and the display device having the structure described above with reference to FIG. 1 and FIG. 2 may be realized without further changes to the structure. In other words, without further changes to the structure, the display device that may be completely folded without a gap may be provided.

Figure 7:
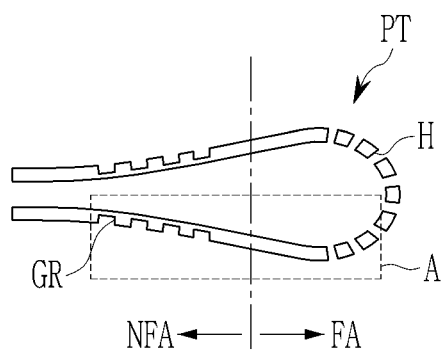
FIG. 7 shows a side view of a plate included in a display panel, when the plate is formed of a single layer of a metal.
Figure 8:
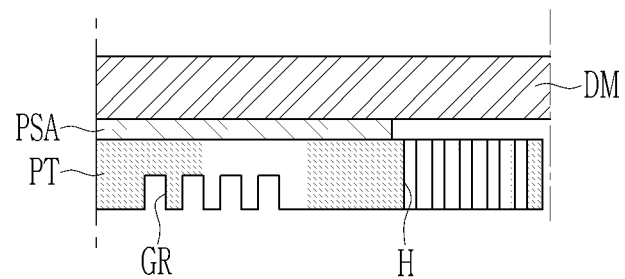
FIG. 8 shows a cross-sectional view of a display device including a plate formed of a single layer of a metal.

FIG. 7 shows a side view of a plate (PT) included in a display panel, when the plate (PT) is formed of a single layer of a metal, and FIG. 8 shows a cross-sectional view of a display device including the plate (PT) formed of the single layer of metal. FIG. 7 may correspond to the same region as that shown in FIG. 5, but with the plate (PT) formed of the single layer of metal, and FIG. 8 may correspond to the same cross-section as that shown in FIG. 6, but with the plate (PT) formed of the single layer of metal.

Referring to FIG. 7 and FIG. 8, the plate (PT) may be formed of a single layer in the present embodiment. A plurality of grooves (GR) are formed in the peripheral folding area (NFA), such that the peripheral folding area (NFA) may be bent in the reverse direction. When the plate (PT) is formed of a single layer, it may be difficult to allow different bending directions in the folding area (FA) and the peripheral folding area (NFA), so the grooves (GR) are positioned in the peripheral folding area (NFA) as shown in FIG. 7 and FIG. 8. The grooves (GR) in the peripheral folding area (NFA) do not penetrate through the plate (PT), unlike the holes (H) in the folding area (FA). The grooves (GR) may reduce the elasticity coefficient of the peripheral folding area (NFA), so that the peripheral folding area (NFA) may be bent in the reverse direction from the bending direction of the folding area (FA).

However, when the reverse bending of the peripheral folding area (NFA) is realized by a method for forming the grooves (GR) in the plate (PT), the grooves (GR) may not be uniformly formed in the plate (PT). Therefore, a taper may be generated by the non-uniformity of the thicknesses of the grooves (GR), and an etching process for forming the grooves (GR) may be further performed, so that a processing time may be increased. Materials for forming the grooves (GR) in the plate (PT) may be limited. For example, while it may be relatively easy to form the grooves (GR) when the plate (PT) is made of a metal, it may be difficult to form uniform or substantially uniform grooves (GR) when the plate (PT) is made of a reinforced plastic, such as carbon fiber reinforced plastic, or glass fiber reinforced plastic.

When the plate (PT) includes a metal as shown in FIG. 7 and FIG. 8, a recognition rate of a digitizer (e.g., a touch sensing layer, an input sensing layer, a touch senor, an input sensor, and/or the like) positioned at a bottom of the plate (PT) may be reduced. In other words, when the plate (PT) and the digitizer respectively include a conductive material, the recognition rate of the digitizer may be reduced. This will be described in more detail below with reference to FIG. 17.

According to one or more embodiments of the present disclosure, the plate (PT) may be formed of a multilayered stacked structure of suitable materials with the isotropic elasticity coefficient/the anisotropic elasticity coefficient discussed above, thereby realizing the reverse direction bending of the peripheral folding area of the display panel without the additional formation of the grooves (GR). The plate (PT) may include a first layer, a second layer, and a third layer, and the first layer and the third layer may be anisotropic, and the second layer may be isotropic. In another way, the first layer and the third layer may be isotropic, and the second layer may be anisotropic. As the plate (PT) includes isotropic and anisotropic layers, rigidity of the plate (PT) may be maintained or substantially maintained, and the plate (PT) may be easily bent. Further, in some embodiments, the plate (PT) may include the reinforced plastic, rather than the metal. As the plate (PT) includes the reinforced plastic instead of the metal, the recognition rate of the digitizer including a metal that is positioned at the bottom of the plate (PT) may not be hindered or may be improved.

Figure 9:
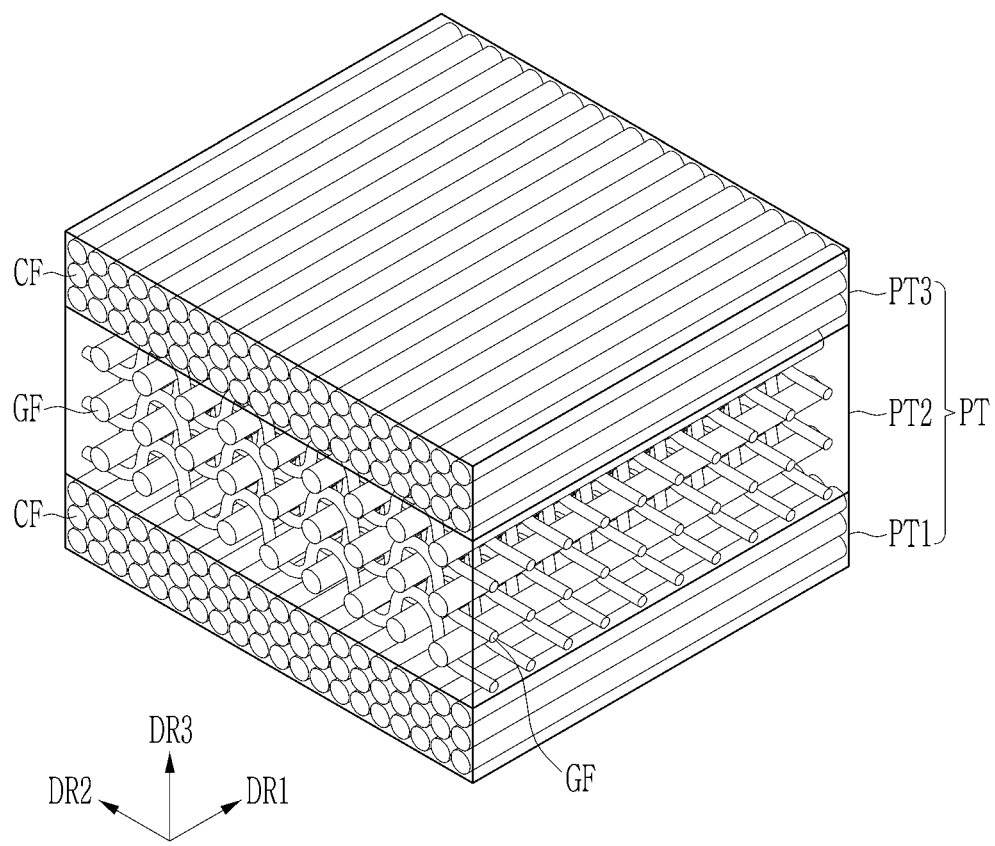
FIG. 9 shows a perspective cross-sectional view of a plate according to an embodiment of the present disclosure.

FIG. 9 shows a perspective cross-sectional view of a plate according to an embodiment of the present disclosure. Referring to FIG. 9, the plate (PT) includes a first layer (PT1), a second layer (PT2), and a third layer (PT3).

The first layer (PT1) and the third layer (PT3) may include (e.g., may be made of) carbon fiber reinforced plastic (CFRP). The carbon fiber reinforced plastic (CFRP) represents plastic hardened by impregnating a resin into carbon fibers (CF). As shown in FIG. 9, the carbon fibers (CF) may extend in a first direction (DR1) in the first layer (PT1) and the third layer (PT3). The display device including the plate (PT) according to the present embodiment may be bent in a second direction (DR2) crossing the first direction (DR1). In other words, in the plate (PT) according to the present embodiment, the direction (DR1) in which the carbon fibers (CF) extend may be perpendicular to or substantially perpendicular to the direction (DR2) in which the display device is bent. Therefore, as described in more detail hereinafter, the display device may be easily bent without forming the additional grooves (GR) in the plate (PT), and particularly, as shown in FIG. 1, the peripheral folding area (NFA) and the folding area (FA) may be bent in the different directions from each other.

Figure 10:
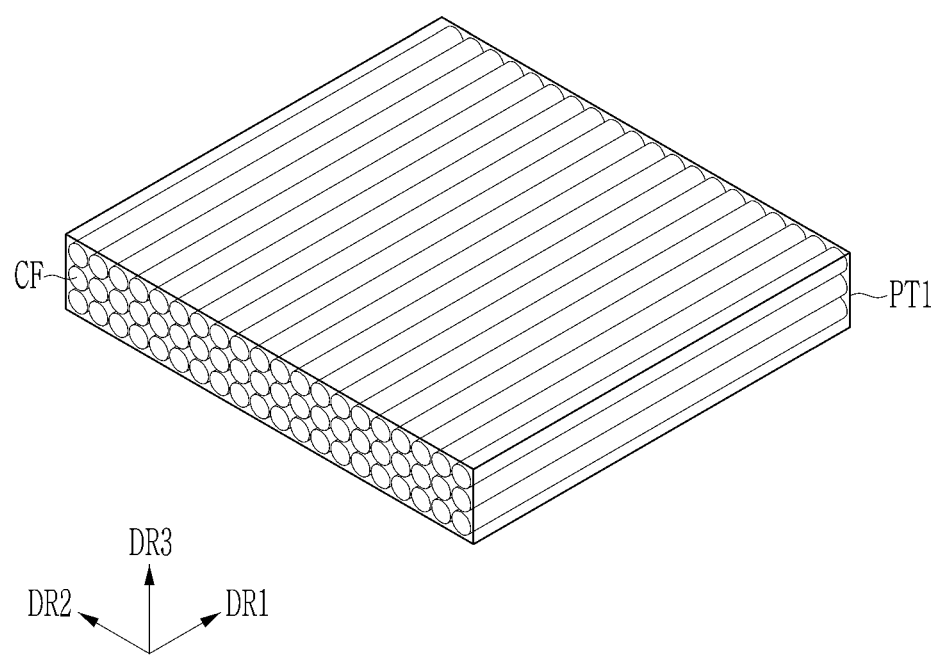
FIG. 10 shows a first layer of FIG. 9.

FIG. 10 shows the first layer (PT1) of FIG. 9. As shown in FIG. 10, the carbon fibers (CF) extend in the first direction (DR1), and the elasticity coefficients of the first layer (PT1) may be different according to different directions. In other words, the elasticity coefficient in the first direction (DR1) in which the carbon fibers extend may be relatively high, and the elasticity coefficient in the second direction (DR2) that is perpendicular to or substantially perpendicularly to the first direction (DR1) may be relatively low.

For example, the elasticity coefficient in the first direction (DR1) may be about 100 MPa to 200 MPa. The elasticity coefficient in the second direction (DR2) may be about 1 MPa to 50 MPa. In an embodiment, a difference of elasticity coefficients of the first layer (PT1) of the plate (PT) in the first direction (DR1) and the second direction (DR2) may be about twice to twenty times from each other.

The display device including the plate (PT) according to the present embodiment may be bent in the second direction (DR2). Here, the elasticity coefficient in the second direction (DR2) is relatively low, so the display device may be easily bent. While FIG. 10 shows the first layer (PT1), the first layer (PT1) and the third layer (PT3) may include the same or substantially the same material as each other according to the embodiment described above with reference to FIG. 9, and thus, the description of the first layer (PT1) with reference to FIG. 10 may be applicable to that of the third layer (PT3) of FIG. 9. Accordingly, redundant description thereof may not be repeated.

Figure 11:
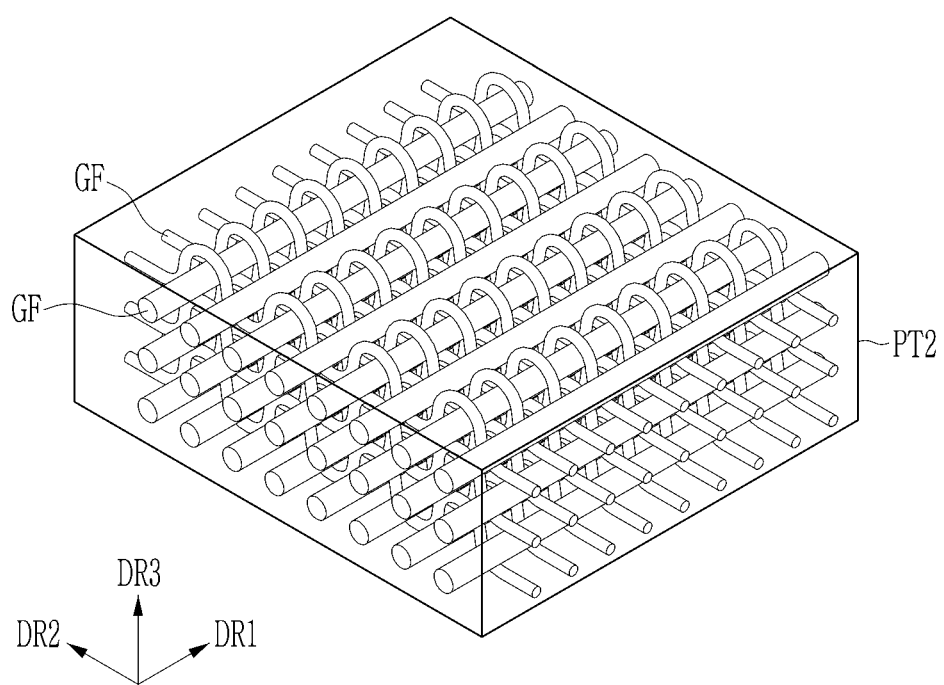
FIG. 11 shows a second layer of FIG. 9.

FIG. 11 shows the second layer (PT2) of FIG. 9. The second layer (PT2) may include (e.g., may be made of) glass fiber reinforced plastic (GFRP). The glass fiber reinforced plastic (GFRP) may be a combination of materials including glass fibers (GF) and a thermosetting resin. The thermosetting resin may include, for example, an unsaturated polyester resin or an epoxy resin.

As shown in FIG. 11, the glass fibers (GF) may be uniformly or substantially uniformly arranged in a constant direction at (e.g., in or on) the second layer (PT2) including the glass fiber reinforced plastic. In other words, unlike the carbon fibers (CF) in the carbon fiber reinforced plastic shown in FIG. 10, the glass fibers (GF) may be uniformly or substantially uniformly arranged in the first direction (DR1) and the second direction (DR2). For example, the glass fibers (GF) may be arranged in a weaving structure. Therefore, the elasticity coefficient of the second layer (PT2) in the first direction (DR1) may correspond to (e.g., may be the same or substantially the same as) the elasticity coefficient of the second layer (PT2) in the second direction (DR2). For example, the elasticity coefficients of the second layer (PT2) including the glass fiber reinforced plastic in the first direction (DR1) and the second direction (DR2) may be about 10 MPa to 30 MPa. However, the present disclosure is not limited thereto.

Referring again to FIG. 9, the plate (PT) according to the present embodiment has a structure in which the second layer (PT2) with the isotropic elasticity coefficient is positioned (e.g., interposed) between the first layer (PT1) and the third layer (PT3) with the anisotropic elasticity coefficients. Therefore, the display device including the plate (PT) may maintain or substantially maintain a suitable rigidity of the plate (PT), while being easily bent. Accordingly, as shown in FIG. 1, the display panel in which the folding area (FA) is bent in the forward direction, and the peripheral folding area (NFA) is bent in the opposite direction to that of the folding area (FA), may be provided.

Referring again to FIG. 9, an entire thickness (e.g., in a third direction (DR3)) of the plate (PT) may be about 150 µm to 250 µm. When the thickness of the plate (PT) is less than 150 µm, the plate (PT) may not sufficiently support the display module (e.g., the display panel), and when the thickness of the plate (PT) is greater than 250 µm, the plate (PT) may be too thick to be easily bent.

The thicknesses of the first layer (PT1) and the third layer (PT3) may each be about 100 µm to 150 µm. The thickness of the second layer (PT2) may be about 10 µm to 50 µm. In this case, a range by which the plate (PT) may have an appropriate anisotropic elasticity coefficient within a suitable thickness range (e.g., an optimal thickness range such as about 150 µm to 250 µm) of the plate (PT) may be provided. In other words, when the thickness of the second layer (PT) is less than 10 µm, influences of the first layer (PT1) and the third layer (PT3) having relatively high moduli may be increased, and the plate (PT) may not be easily bent. The same may be said when the thicknesses of the first layer (PT1) and the third layer (PT3) are each greater than 150 µm.

When the thickness of the second layer (PT2) is greater than 50 µm, the plate (PT) may be insufficiently anisotropic. The modulus of the glass fiber reinforced plastic of the second layer (PT2) is less than the moduli of the carbon fiber reinforced plastic of the first layer (PT1) and the third layer (PT3), so when the thickness of the second layer (PT2) increases, durability of the plate (PT) may be reduced. The same may be said when the thicknesses of the first layer (PT1) and the third layer (PT3) are less than 100 µm.

Figure 12:
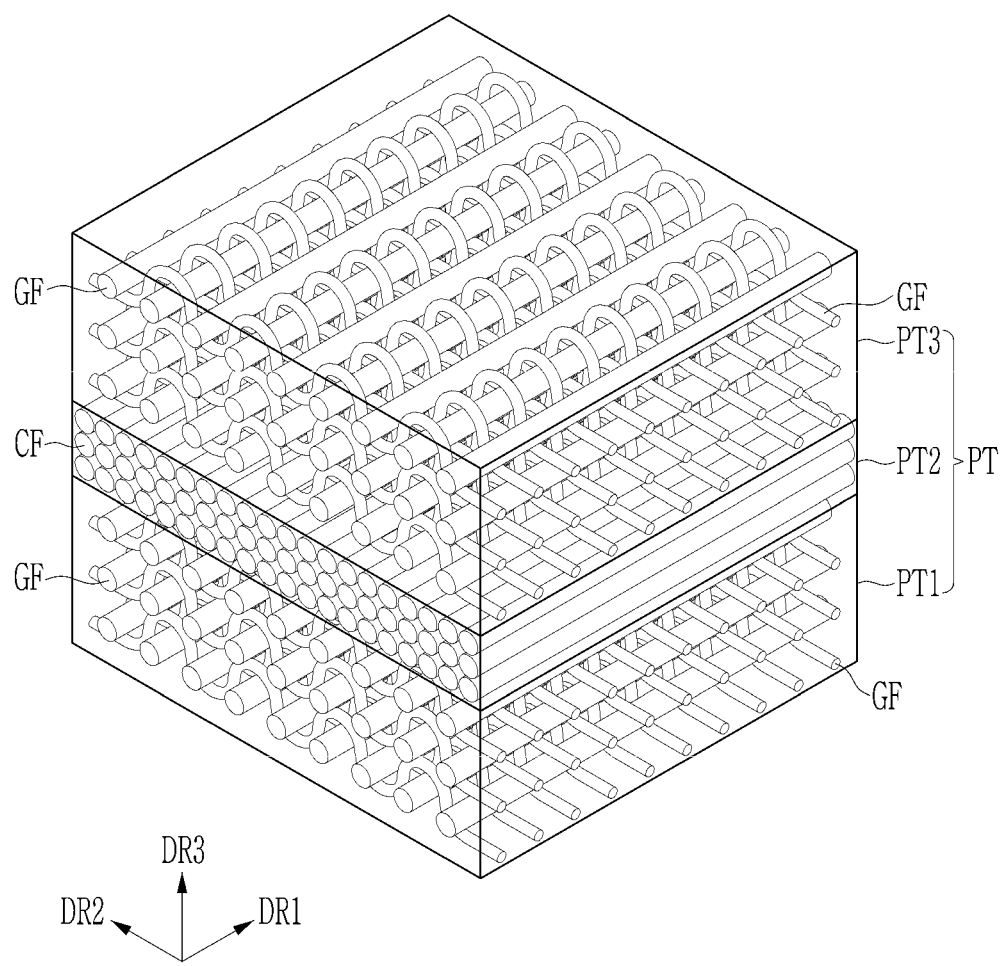
FIG. 12 shows a perspective cross-sectional view of a plate according to another embodiment of the present disclosure.

FIG. 12 shows a perspective cross-sectional view of a plate (PT) according to another embodiment of the present disclosure. The embodiment shown in FIG. 12 may be different from the embodiment shown in FIG. 9. For example, the embodiment described above with reference to FIG. 9 describes a stacked structure of CFRP-GFRP-CFRP (e.g., a CGC structure), while the embodiment shown in FIG. 12 has a stacked structure of GFRP-CFRP-GFRP in that order (e.g., a GCG structure). Accordingly, the difference therebetween may be mainly described hereinafter, and redundant description thereof may be simplified or may not be repeated In the plate (PT) according to the embodiment shown in FIG. 12, the first layer (PT1) and the third layer (PT3) may include (e.g., may be made of) glass fiber reinforced plastic (GFRP). The glass fiber reinforced plastic (GFRP) of the first layer (PT1) and the third layer (PT3) of FIG. 12 may be the same or substantially the same as (or similar to) that of the second layer (PT2) described above with reference to FIG. 11, and thus, redundant description thereof may be simplified or may not be repeated. In other words, the first layer (PT1) and the third layer (PT3) may have isotropic elasticity coefficients. For example, the elasticity coefficients of the first layer (PT1) and the third layer (PT3) including the glass fiber reinforced plastic in the first direction (DR1) and the second direction (DR2) may be about 10 MPa to 30 MPa.

The thicknesses of the first layer (PT1) and the third layer (PT3) may each be about 10 μm to 50 μm.

Referring to FIG. 12, the second layer (PT2) may include (e.g., may be made of) carbon fiber reinforced plastic (CFRP). The carbon fiber reinforced plastic (CFRP) of the second layer (PT2) shown in FIG. 12 may be the same or substantially the same as (or similar to) that of the first and third layers (PT1) and (PT3) described above with reference to FIG. 10, and thus, redundant description thereof may be simplified or may not be repeated. In other words, the elasticity coefficient of the second layer (PT2) may be changed depending on the different directions. The elasticity coefficient in the first direction (DR1) in which the carbon fibers (CF) extend may be relatively high, and the elasticity coefficient in the second direction (DR2) that is perpendicular to or substantially perpendicular to the first direction (DR1) may be relatively low. For example, the elasticity coefficient in the first direction (DR1) may be about 100 MPa to 200 MPa, and the elasticity coefficient in the second direction (DR2) may be about 1 MPa to 50 MPa.

In the present embodiment, the difference of the elasticity coefficients of the second layer (PT2) of the plate (PT) in the first direction (DR1) and the second direction (DR2) may be about twice to twenty times from each other.

The thickness of the second layer (PT2) may be about 100 μm to 150 μm.

In an embodiment, the entire thickness of the plate (PT) may be about 150 μm to 250 μm. When the thickness of the plate (PT) is less than 150 μm, the plate (PT) may not sufficiently support the display module (e.g., the display panel), and when the thickness of the plate (PT) is equal to or greater than about 250 μm, the plate (PT) may be too thick and may not be easily bent.

FIG. 9 and FIG. 12 show that the plate (PT) has a triple-layered structure including reinforced plastic, and in some embodiments, the plate (PT) may further include an auxiliary layer for the purpose of radiation shielding and/or reinforcement of rigidity.

Figure 13:
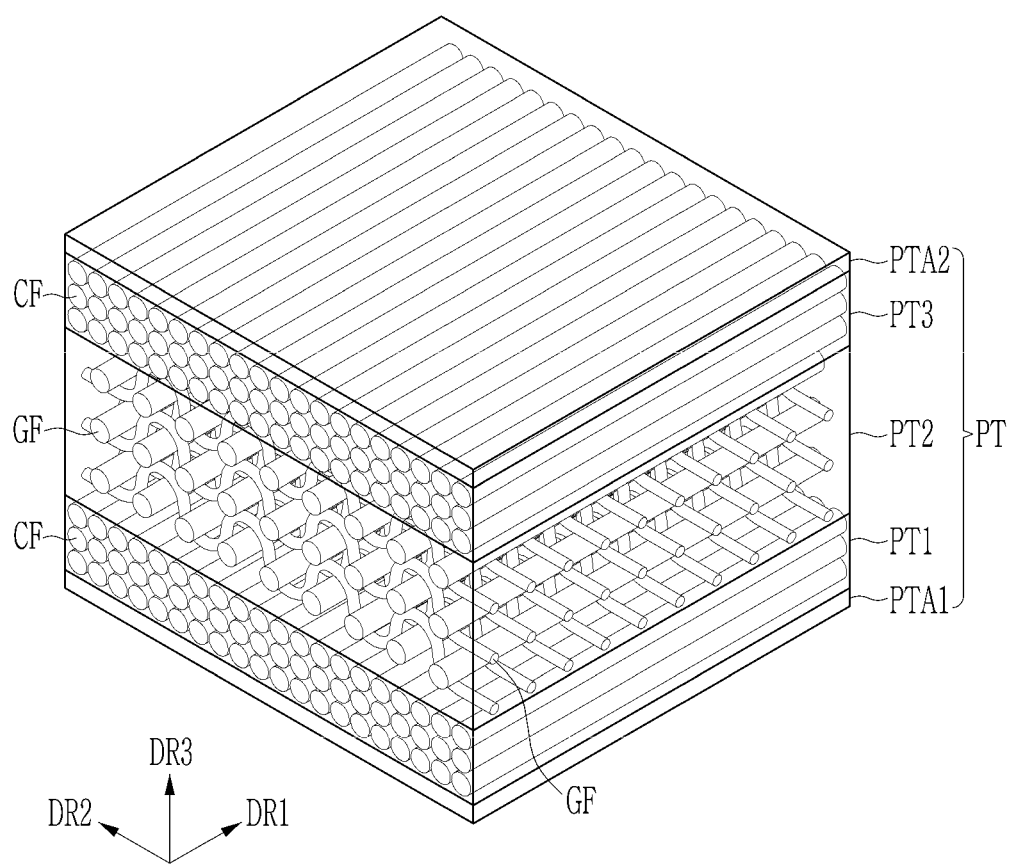
FIG. 13 shows a perspective cross-sectional view of a plate according to another embodiment of the present disclosure.

FIG. 13 shows a perspective cross-sectional view of a plate according to another embodiment of the present disclosure. Referring to FIG. 13, the plate (PT) according to the present embodiment may be the same or substantially the same as (or similar to) the embodiment described above with reference to FIG. 9, except in FIG. 13, the plate (PT) further includes a first auxiliary layer (PTA1) contacting the first layer (PT1), and a second auxiliary layer (PTA2) contacting the third layer (PT3). In other words, the first layer (PT1) to the third layer (PT3) may correspond to (e.g., may be the same or substantially the same as) those described above with reference to FIG. 9, and thus, redundant description thereof may be simplified or may not be repeated.

The first auxiliary layer (PTA1) and the second auxiliary layer (PTA2) may be positioned on outermost sides, respectively, of the plate (PT). The first auxiliary layer (PTA1) and the second auxiliary layer (PTA2) may include one or more metals. For example each of the first auxiliary layer (PTA1) and the second auxiliary layer (PTA2) may include at least one of copper, stainless steel (SUS), aluminum (Al), or graphite.

The first auxiliary layer (PTA1) and the second auxiliary layer (PTA2) may improve a radiation characteristic of the plate (PT), and/or may reinforce a rigidity of the plate (PT).

The thicknesses of the first auxiliary layer (PTA1) and the second auxiliary layer (PTA2) may be about 5 μm to 20 μm. When the thicknesses are equal to or less than 5 μm, the first auxiliary layer (PTA1) and the second auxiliary layer (PTA2) may not have sufficient rigidity and radiation characteristics, and when the thicknesses are equal to or greater than 20 μm, the folding characteristics of the first auxiliary layer (PTA1) and the second auxiliary layer (PTA2) may be reduced.

While FIG. 13 shows a configuration in which the first auxiliary layer (PTA1) and the second auxiliary layer (PTA2) are positioned on the outermost sides of the plate (PT), the present disclosure is not limited thereto, and the first auxiliary layer (PTA1) and the second auxiliary layer (PTA1) may be positioned inside (e.g., within) the plate (PT).

Figure 14:
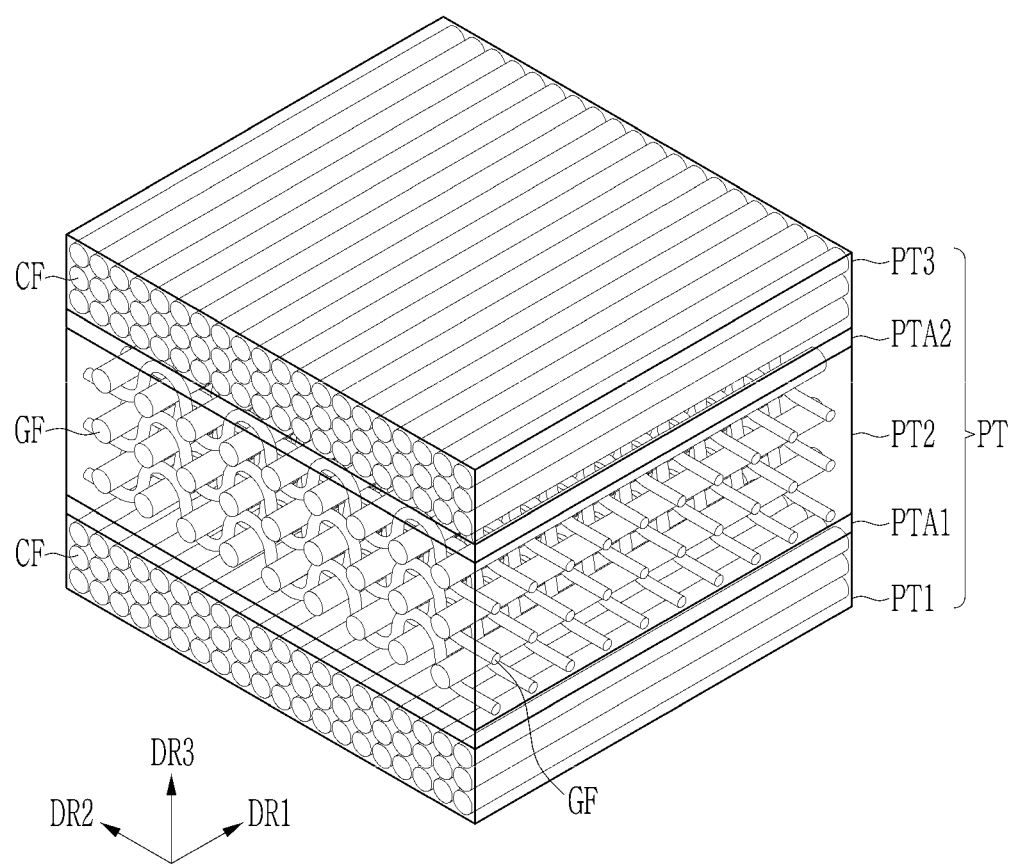
FIG. 14 shows a perspective cross-sectional view of a plate according to another embodiment of the present disclosure.

FIG. 14 shows a perspective cross-sectional view of a plate according to another embodiment of the present disclosure. Referring to FIG. 14, the first auxiliary layer (PTA1) may be positioned (e.g., interposed) between the first layer (PT1) and the second layer (PT2), and the second auxiliary layer (PTA2) may be positioned (e.g., interposed) between the second layer (PT2) and the third layer (PT3). In FIG. 14, the first layer (PT1) to the third layer (PT3) may correspond to (e.g., may be the same or substantially the same as) those described above with reference to FIG. 9, and thus, redundant description thereof is not repeated. In FIG. 14, the materials and thicknesses of the first auxiliary layer (PTA1) and the second auxiliary layer (PTA2) correspond to (e.g., may be the same or substantially the same as) those described above with reference to FIG. 13, and thus, redundant description thereof is not repeated.

Figure 15:
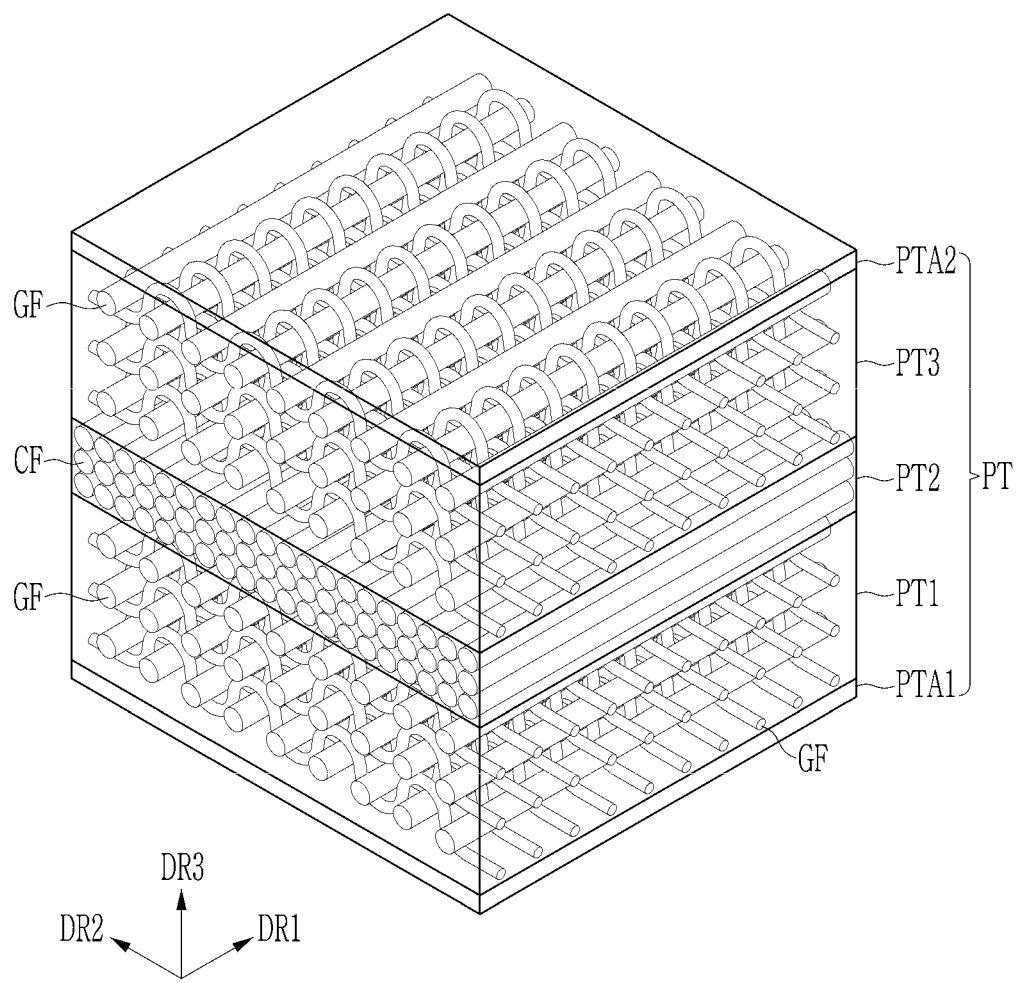
FIG. 15 shows a perspective cross-sectional view of a plate according to another embodiment of the present disclosure.

FIG. 15 shows a perspective cross-sectional view of a plate according to another embodiment of the present disclosure. The embodiment shown in FIG. 15 corresponds to (e.g., may be the same or substantially the same as) the embodiment described above with reference to FIG. 13, except that the first layer (PT1) and the third layer (PT3) are isotropic and the second layer (PT2) is anisotropic like the embodiment described above with reference to FIG. 12. Accordingly, redundant description thereof may be simplified or may not be repeated.

The first layer (PT1) and the third layer (PT3) may include glass fiber reinforced plastic (GFRP), and the second layer (PT2) may include carbon fiber reinforced plastic (CFRP). Carbon fibers (CF) of the second layer (PT2) may be positioned in parallel or substantially in parallel with each other to be perpendicular to or substantially perpendicular to the bending direction (e.g., the second direction (DR2)) in which the plate (PT) is bent.

Figure 16:
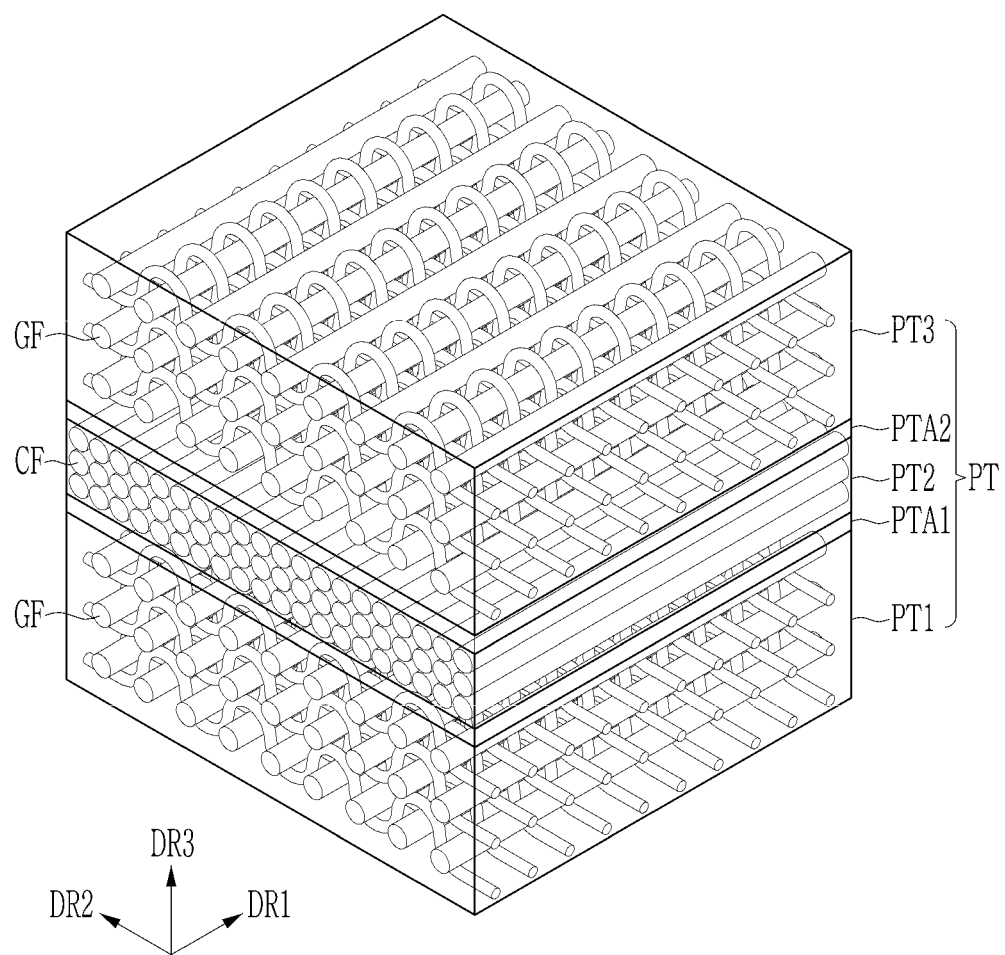
FIG. 16 shows a perspective cross-sectional view of a plate according to another embodiment of the present disclosure.

FIG. 16 shows a perspective cross-sectional view of a plate according to another embodiment of the present disclosure. The embodiment show in FIG. 16 corresponds to (e.g., may be the same or substantially the same as) the embodiment described above with reference to FIG. 14, except that the first layer (PT1) and the third layer (PT3) are isotropic and the second layer (PT2) is anisotropic like the embodiment described above with reference to FIG. 12. Accordingly, redundant description thereof may be simplified or may not be repeated.

The first layer (PT1) and the third layer (PT3) may include glass fiber reinforced plastic (GFRP), and the second layer (PT2) may include carbon fiber reinforced plastic (CFRP). The carbon fibers (CF) of the second layer (PT2) may be positioned in parallel or substantially in parallel with each other to be perpendicular to or substantially perpendicular to the bending direction (e.g., the second direction (DR2)) in which the plate (PT) is bent.

Figure 17:
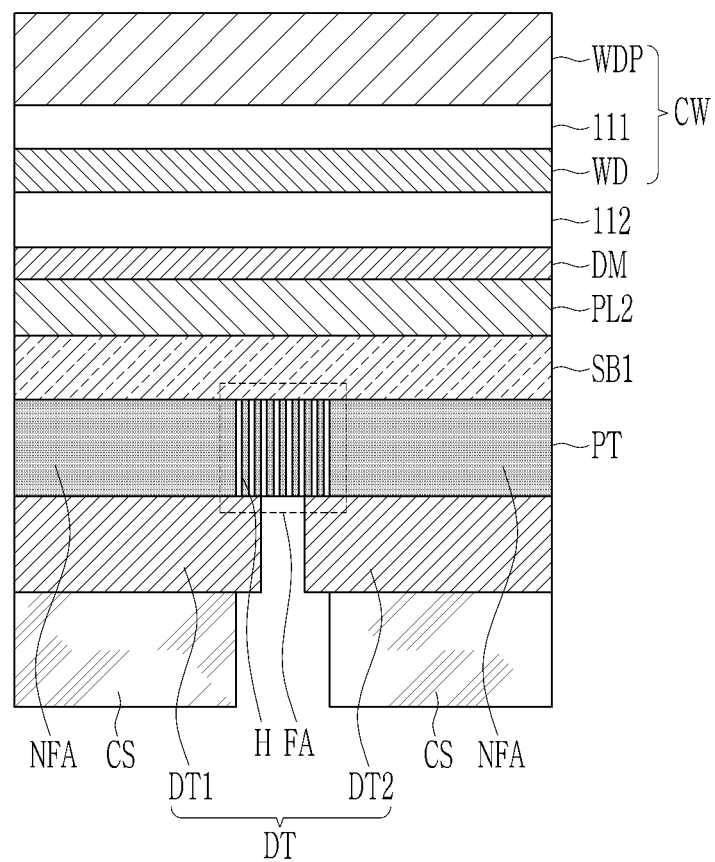
FIG. 17 shows a cross-sectional view of a display device according to one or more embodiments of the present disclosure.

A display device including the plate (PT) according to one or more embodiments of the present disclosure will now be described in more detail with reference to figures. FIG. 17 shows a cross-sectional view of a display device according to one or more embodiments of the present disclosure. Some example structures thereof will be described in more detail below with reference to FIG. 21.

Referring to FIG. 17, the display device according to the present embodiment includes a display module (DM) (e.g., a display panel (DP), a display layer, or a display that may include the display panel according to one or more embodiments described above), and a cover window (CW) positioned on the display module (DM). The cover window (CW) may include a window (WD), and a window protecting member (WDP) positioned on an upper portion of the window (WD). The window protecting member (WDP) may be adhered to an upper side (e.g., an upper surface) of the window (WD) through a first adhesive layer 111. The window protecting member (WDP) may protect the window (WD) from external impacts, and may prevent or substantially prevent the upper side of the window (WD) from being scratched, or may reduce or minimize the scratch. The window protecting member (WDP) may include a polymer resin. However, the present disclosure is not limited thereto, and the window protecting member (WDP) may include an inorganic material.

The window (WD) may include (e.g., may be made of) glass. However, the present disclosure is not limited thereto. The window (WD) may include a polymer resin.

The cover window (CW) and the display module (DM) may be adhered to each other with a second adhesive layer 112.

A second protecting member (PL2) may be positioned on a lower portion of the display module (DM) (e.g., a lower portion of the display panel (DP)). In some embodiments, the second protecting member (PL2) may be adhered to a lower side (e.g., a lower surface) of the display module (DM) (e.g., the display panel (DP)) through an adhesive layer. The second protecting member (PL2) may be disposed on the lower portion of the display module (DM) (e.g., the display panel (DP)) to support the display module (DM) and to protect the display module (DM) from external impacts. The second protecting member (PL2) may include (e.g., may be made of) a polymer resin, for example, such as a polyethylene terephthalate or a polyimide.

A first support member (SB1) may be positioned on a lower portion of the second protecting member (PL2). In some embodiments, the first support member (SB1) may be adhered to the second protecting member (PL2) through an adhesive layer.

The first support member (SB1) may be disposed on the lower portion of the display module (DM) (e.g., the display panel (DP)) to support the display module (DM) and to protect the display module (DM) from external impacts. The first support member (SB1) may include (e.g., may be made of) a polymer resin, for example, such as a polyethylene terephthalate or a polyimide.

The plate (PT) may be positioned on a lower portion of the first support member (SB1). One or more embodiments of the plate (PT) have been described above with reference to FIG. 1 to FIG. 16. In other words, the plate (PT) shown in FIG. 17 may be the same or substantially the same as any one of the plates (PT) described above with reference to FIG. 5, FIG. 6, FIG. 9, and FIG. 12 to FIG. 16, and thus, redundant description thereof may be simplified or may not be repeated.

In other words, the plate (PT) may include the folding area (FA) and the peripheral folding area (NFA). The plurality of holes (H) may be formed in the folding area (FA), so the display device may be bent. As described above, the plate (PT) may have a structure in which various suitable materials with isotropic/anisotropic elasticity coefficients are stacked in multi-layers. For example, the materials may be stacked in an order of an isotropic layer, an anisotropic layer, and an isotropic layer, or may be stacked in an order of an anisotropic layer, an isotropic layer, and an anisotropic layer. The anisotropic layer may be carbon fiber reinforced plastic (CFRP) in which the carbon fibers extend in one direction. The direction in which the carbon fibers extend may be perpendicular to or substantially perpendicular to the direction in which the plate (PT) is bent. In other words, the plate (PT) may have a relatively high elasticity coefficient in the direction in which the carbon fibers extend, and the plate (PT) may have a relatively low elasticity coefficient in the direction that is perpendicular to or substantially perpendicular to the direction in which the carbon fibers extend. Accordingly, the plate (PT) may be easily bent in the direction that is perpendicular to or substantially perpendicular to the direction in which the carbon fibers extend. A relationship between the moduli of the plate (PT) in the respective directions and a folding axis will be described in more detail below.

Referring to FIG. 17, a digitizer (DT) (e.g., a touch sensing layer, an input sensing layer, a touch senor, an input sensor, and/or the like) may be positioned on the lower portion of the plate (PT). The digitizer (DT) may sense an intensity and a direction of a signal input, for example, by an electronic pen.

In an embodiment, the digitizer (DT) may include a first digitizer (DT1) positioned on a left with respect to a folding axis (FL) (e.g., a left side of FIG. 17 relative to the folding area FA) and a second digitizer (DT2) positioned on a right of the folding axis (FL) (e.g., a right side of FIG. 17 relative to the folding area FA).

The digitizer (DT) may include (e.g., may be made of) a metal. The plate (PT) may not include a metal, and may include (e.g., may be made of) reinforced plastic, so that the plate (PT) may not influence the recognition rate of the digitizer (DT). In other words, when the plate (PT) has conductivity, the recognition rate of the digitizer (DT) may be reduced, and when the plate (PT) has no conductivity according to one or more embodiments of the present disclosure, the recognition rate of the digitizer (DT) may not be hindered or may be improved.

A cushion layer (CS) may be positioned below the digitizer (DT). The cushion layer (CS) may prevent or substantially prevent a structure disposed on the cushion layer (CS) from being damaged by external impacts, or may reduce or minimize the damage. In an embodiment, the cushion layer (CS) may include a pressure sensitive adhesive. The display device will be described in more detail below with reference to FIG. 21.

Figure 18:
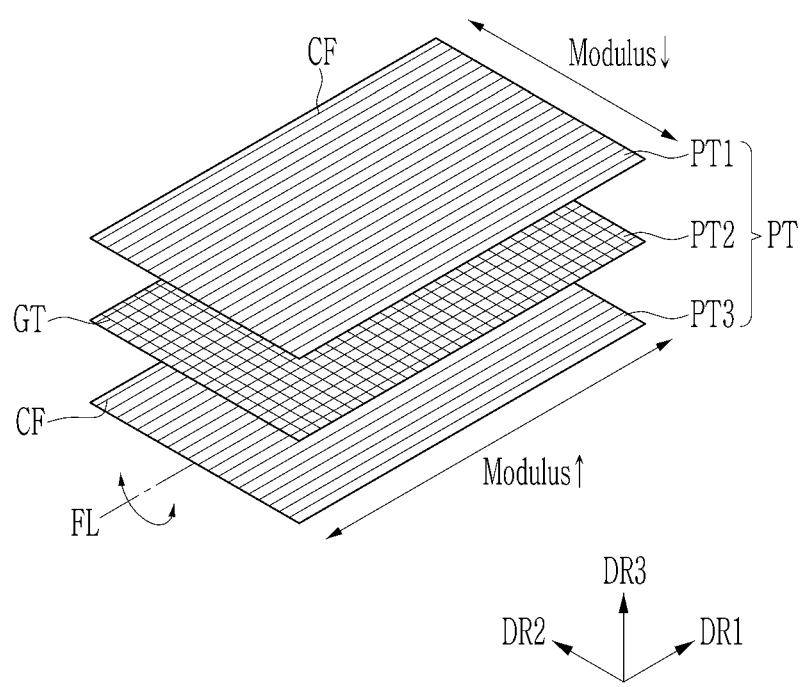
FIG. 18 shows a relationship between a folding axis and the moduli of a first layer, a second layer, and a third layer of a plate.

FIG. 18 shows a relationship between a folding axis (FL) and the moduli of a first layer (PT1), a second layer (PT2), and a third layer (PT3) of a plate (PT).

Referring to FIG. 18, the carbon fibers (CF) may extend in the first direction (DR1) at (e.g., in or on) the first layer (PT1) and the third layer (PT3). The glass fibers (GF) at (e.g., in or on) the second layer (PT2) may be uniformly or substantially uniformly arranged in the first direction (DR1) and the second direction (DR2).

Thus, the plate (PT) may have a relatively high elasticity coefficient in the first direction (DR1), and may have a relatively low elasticity coefficient in the second direction (DR2). The elasticity coefficient of the plate (PT) in the first direction (DR1) may be about 40 GPa to 60 GPa. The elasticity coefficient of the plate (PT) in the second direction (DR2) may be about 10 GPa to 30 GPa.

In an embodiment, the difference between the elasticity coefficient of the plate (PT) in the first direction (DR1) and the elasticity coefficient of the second direction (DR2) may be about 1.5 to 6 times from each other.

The folding axis (FL) extends in the first direction (DR1). Therefore, the plate (PT) is folded in the second direction (DR2) along the folding axis (FL), and as described above, the elasticity coefficient thereof in the second direction (DR2) is relatively low so the plate (PT) may be easily folded in the second direction (DR2).

Referring again to FIG. 17, a hole (H) for facilitating folding is positioned in the folding area (FA) of the plate (PT). The hole (H) may be formed by using suitable laser beams or abrasive particles.

Figure 19:
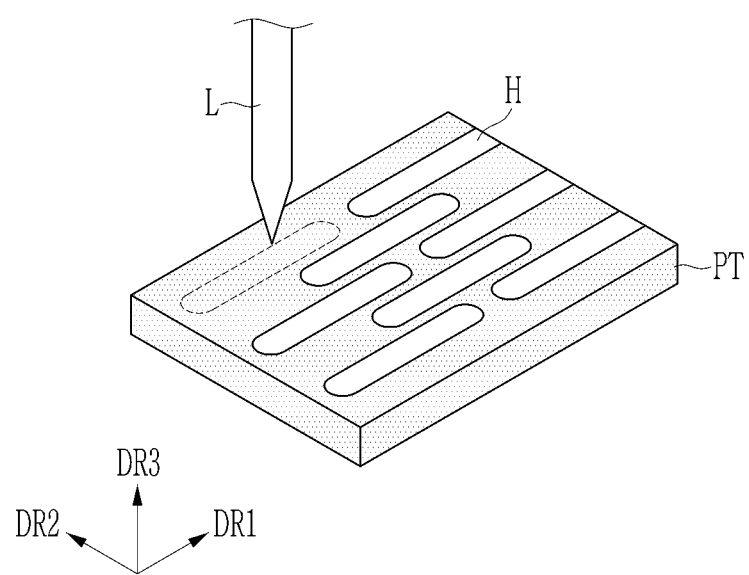
FIGS. 19-20 show a method of forming a hole in a folding area of a plate.
Figure 20:
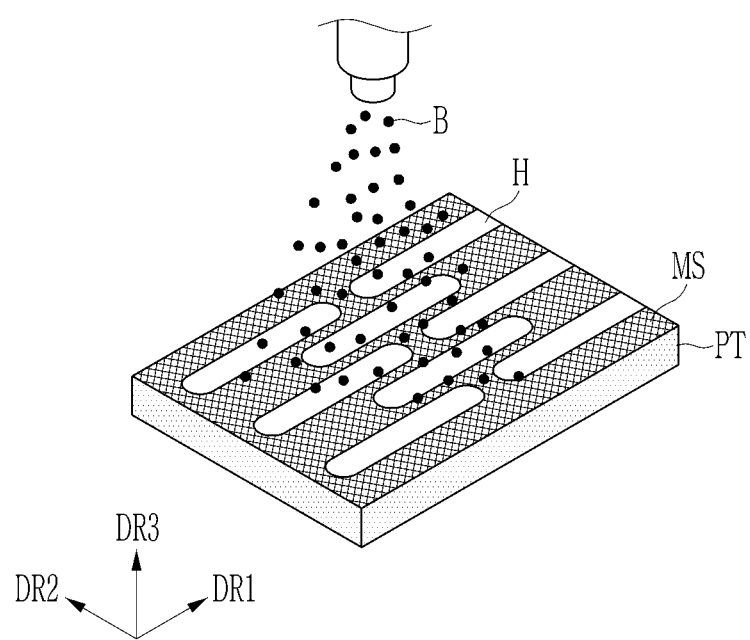

FIG. 19 and FIG. 20 show a method of forming a hole (H) in a folding area (FA) of a plate (PT). Referring to FIG. 19, the hole (H) may be formed by irradiating laser (L) beams to the folding area (FA) of the plate (PT). As shown in FIG. 19, the hole (H) may penetrate through the plate (PT). A formation direction of holes (H) may be the first direction (DR1), and may be parallel to or substantially parallel to the direction in which the folding axis extends. The hole (H) may have a shape in which a plurality of holes are positioned along the first direction (DR1). According to an embodiment, the method may not use an additional mask, and a processing time may be reduced. A length of a long side of the hole (H) may be about 0.2 mm to 7 mm.

Referring to FIG. 20, a mask (MS) may be positioned at (e.g., in or on) the folding area (FA) of the plate (PT), and abrasive particles (B) may be sprayed thereon to form the hole (H). An opening with the same shape as the hole (H) is positioned in the mask (MS), and the plate (PT) at a region corresponding to the opening of the mask (MS). The abrasive particles (B) used in this case may be alumina oxide, and for example, they may be alumina oxide with a diameter of 20 μm to 40 μm. The method of FIG. 20 may be used for processing a wide pattern, and may reduce the processing time.

A display device to which the plate is applied according to one or more embodiments of the present disclosure will now be described in more detail with reference to the figures. However, such configurations described hereinafter are provided as examples in which the plate may be applied, and thus, the present disclosure is not limited thereto.

Figure 21:
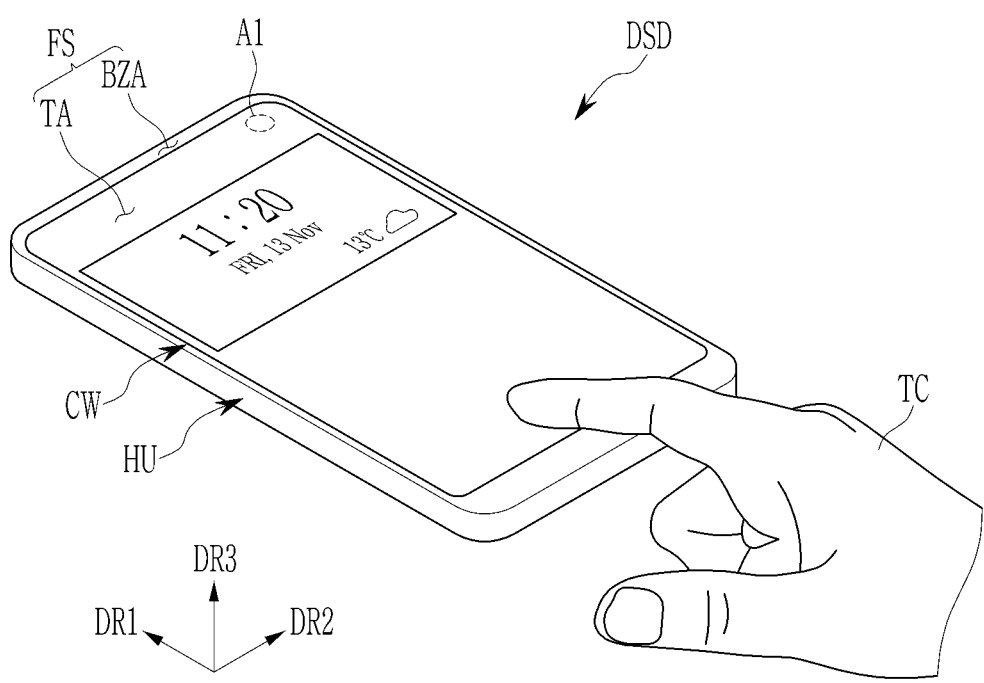
FIG. 21 shows a perspective view of a display device according to an embodiment of the present disclosure.
Figure 22:
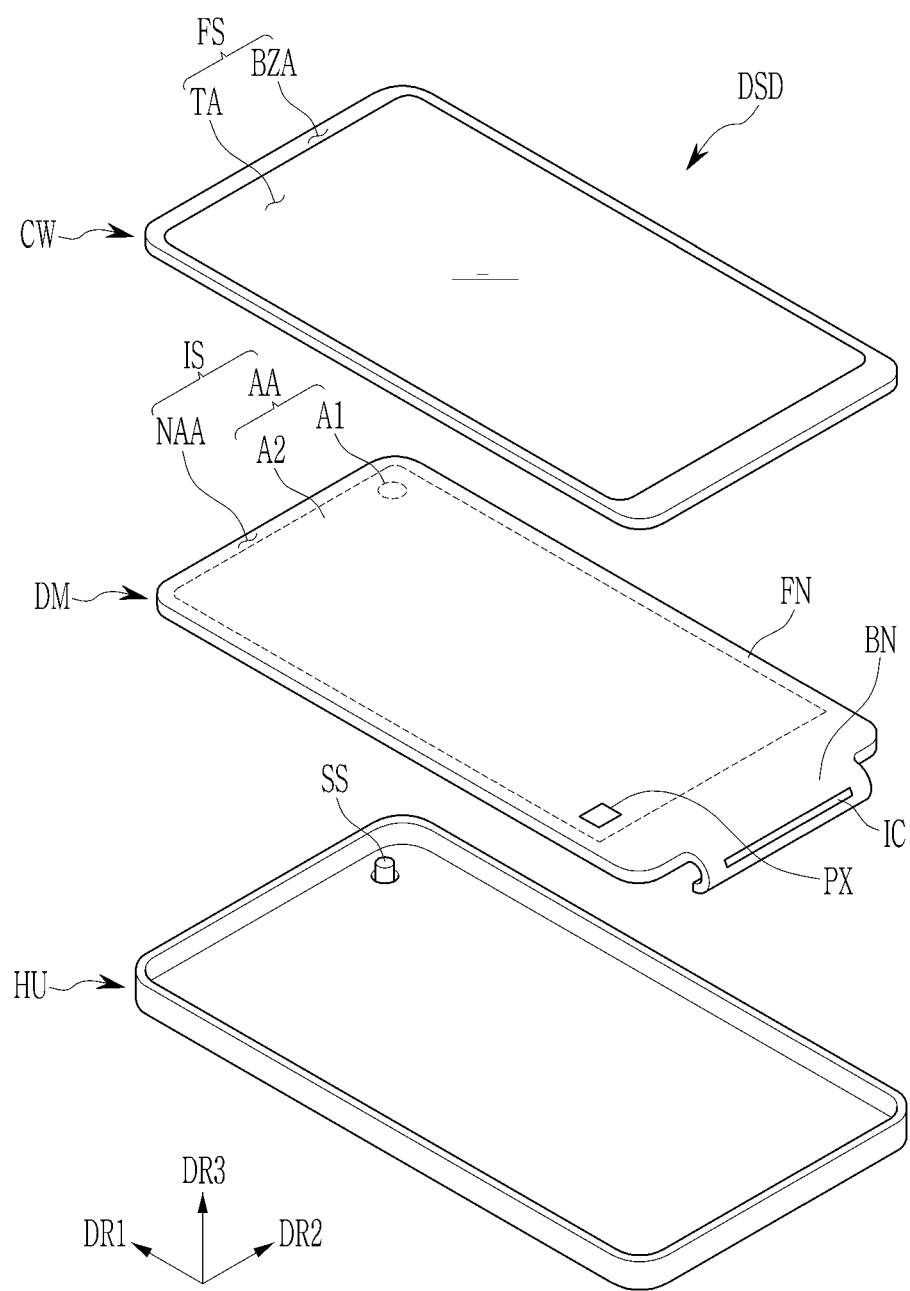
FIG. 22 shows an exploded perspective view of a display device according to an embodiment of the present disclosure.
Figure 23:
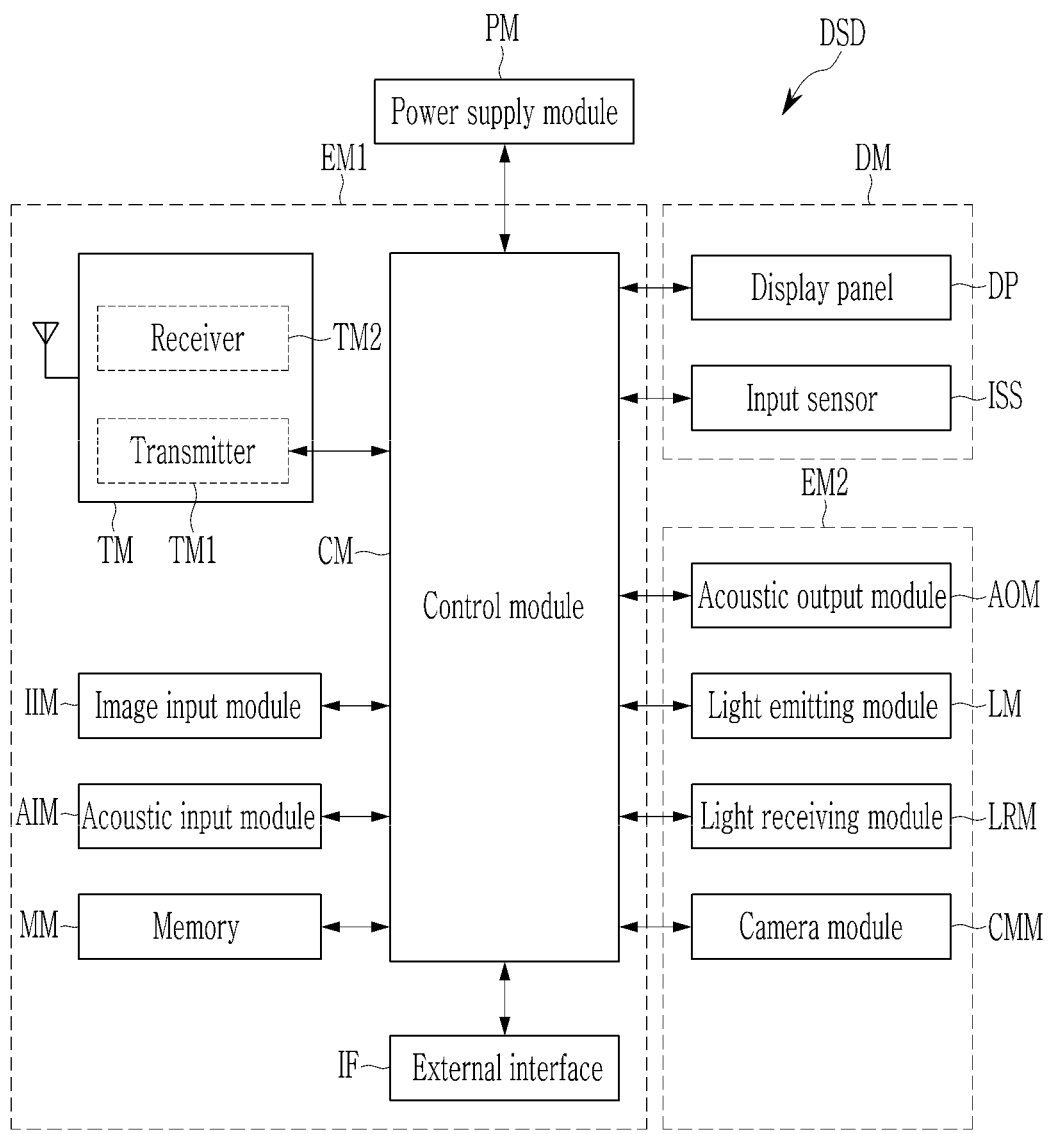
FIG. 23 shows a block diagram of a display device according to an embodiment of the present disclosure.

FIG. 21 shows a perspective view of a display device according to an embodiment, FIG. 22 shows an exploded perspective view of a display device according to an embodiment, and FIG. 23 shows a block diagram of a display device according to an embodiment.

The display device (DSD) according to an embodiment is a device for displaying videos and/or still images. The display device (DSD) may be used as a display screen for various suitable portable display devices, for example, such as mobile phones, smartphones, tablet PCs, mobile communication terminals, personal digital assistants, electronic books, portable media players (PMPs), global positioning system (GPS) devices, ultra-mobile PCs (UMPCs), and/or the like, as well as various suitable products, for example, such as televisions, laptops, monitors, advertisement boards, Internet of things (IOT) devices, and/or the like. The display device (DSD) may also be used as a display screen of various suitable wearable devices, for example, such as smart watches, watch phones, glasses-type displays, head mounted displays (HMD), and/or the like. The display device (DSD) may be used as a dashboard of a vehicle, a center information display (CID) disposed on a center fascia or a dashboard of a vehicle, a room mirror display replacing a side-view mirror of a vehicle, a display disposed on a rear side of a front seat of a vehicle as an entertainment for occupants of a back seat of the vehicle, and/or the like. For convenience of illustration, FIG. 21 shows an example of the display device (DSD) that is used as a smartphone, but the present disclosure is not limited thereto.

Referring to FIG. 21 and FIG. 22, the display device (DSD) may display images on display sides that are parallel to or substantially parallel to the first direction (DR1) and the second direction (DR2) in (e.g., toward) the third direction (DR3). The images may include videos and/or still images. FIG. 21 illustrates a clock as an example of the image.

In the present embodiment, front sides (or upper sides) and rear sides (or lower sides) of respective members are defined with respect to the directions in which the images are displayed. The front sides and the rear sides may oppose each other in the third direction (DR3), and normal directions of the respective front sides and the rear sides may be parallel to or substantially parallel to the third direction (DR3).

The display device (DSD) may sense an input (TC) of a user applied from the outside. The input (TC) of the user may include various suitable kinds of external inputs, for example, such as part of the user's body, light, heat, or pressure. The input (TC) of the user is illustrated to be a hand (or finger) of the user that is applied to the front side of the display device (DSD) in an embodiment. However, the present disclosure is not limited thereto. The input (TC) of the user may be provided in various suitable forms, and the display device (DSD) may sense the input (TC) of the user applied to a lateral side and/or the rear side of the display device (DSD) depending on configurations of the display device (DSD).

A front side (FS) of the cover window (CW) may define the front side of the display device (DSD). The front side (FS) of the cover window (CW) may include a transmission area (TA) and a bezel area (BZA). The transmission area (TA) may be an optically transparent region. For example, the transmission area (TA) may be a region having a visible ray transmittance equal to or greater than about 90%.

The bezel area (BZA) may be positioned near (e.g., adjacent to) the transmission area (TA), for example, around a periphery (e.g., a circumference or a border) of the transmission area (TA). The bezel area (BZA) may have a relatively low light transmittance compared to the transmission area (TA). The bezel area (BZA) may include an opaque material for blocking light. The bezel area (BZA) may have a suitable color (e.g., a predetermined color). The bezel area (BZA) may be defined by a bezel layer that may be provided in addition to a transparent substrate defining the transmission area (TA), or may be defined by an ink layer formed when inserted into or colored on the transparent substrate.

A first area (A1) may be positioned in the transmission area (TA). The first area (A1) may overlap with at least part of an electronic module (e.g., an electronic sensor or an electronic device) (SS). FIG. 21 illustrates the first area (A1) has a circular shape and is disposed at (e.g., in or on) a top right (e.g., the top right corner) of the display device (DSD), but the present disclosure is not limited thereto. The first area (A1) may be provided in a plurality, and may have various suitable shapes depending on a number and shape of the electronic module (SS).

The display device (DSD) may receive external signals for the electronic module (SS) through the first area (A1), or may provide signals output by the electronic module (SS) to the outside. In an embodiment, as the first area (A1) overlaps with the transmission area (TA), an area of the bezel area (BZA) may be reduced.

Referring to FIG. 21 and FIG. 22, the display device (DSD) may include the cover window (CW), a housing (HU), the display module (DM), and the electronic module (SS). In an embodiment, the cover window (CW) may be combined with (e.g., may be connected to or attached to) the housing (HU) to form an exterior of the display device (DSD).

The cover window (CW) may include an insulating panel. For example, the cover window (CW) may include (e.g., may be made of) glass, plastic, or a suitable combination thereof.

The display module (DM) may include a side (IS) including an active area (AA) and a non-active area (NAA). The active area (AA) may be activated by an electrical signal.

The active area (AA) may display the images, and may sense the external inputs (TC). A plurality of pixels (PX) may be disposed in the active area (AA).

The transmission area (TA) may overlap with at least part of the active area (AA). For example, the transmission area (TA) may overlap with an entirety of the active area (AA), or may overlap with at least a part of the active area (AA). The user may view the images through the transmission area (TA), or may provide the external input (TC). However, the present disclosure is not limited thereto. For example, the region in which the images are displayed may be separated from the region in which the external input (TC) is sensed in the active area (AA).

The non-active area (NAA) may overlap with at least a part of the bezel area (BZA). The non-active area (NAA) may be covered by the bezel area (BZA). The non-active area (NAA) may be provided near (e.g., adjacent to) the active area (AA). The non-active area (NAA) may surround (e.g., around a periphery of) the active area (AA). The non-active area (NAA) may not display images. Driving circuits for driving the active area (AA) and/or driving wires may be disposed at (e.g., in or on) the non-active area (NAA).

The display module (DM) may be assembled in a plane state in which the active area (AA) and the non-active area (NAA) face the cover window (CW). However, the present disclosure is not limited thereto. A portion of the peripheral area (NAA) of the display module (DM) may be bent. Part of the non-active area (NAA) may face the rear side of the display device (DSD), and the bezel area (BZA) that may be visible on the entire side of the display device (DSD) may be reduced. In another way, the display module (DM) may be assembled while part of the active area (AA) is bent. In another way, the non-active area (NAA) may be omitted from the display module (DM) as needed or desired.

The active area (AA) may include a first area (A1) and a second area (A2). The first area (A1) may have a relatively high light transmittance, when compared to the second area (A2). The first area (A1) may have a relatively small area, when compared to the second area (A2). The first area (A1) may be defined to be a region that corresponds to a region in which the electronic module (SS) of the display module (DM) is disposed in the housing (HU). In an embodiment, the first area (A1) is shown to have a circular shape, but the present disclosure is not limited thereto, and the first area (A1) may have various suitable shapes, for example, such as a polygon, an oval, or a shape with at least one curve.

The second area (A2) may be near (e.g., adjacent to) the first area (A1). The second area (A2) may enclose (e.g., may surround around a periphery of) the entire first area (A1). However, the present disclosure is not limited thereto. The second area (A2) may partly enclose (e.g., may partially surround around a periphery of) the first area (A1).

Referring to FIG. 23, the display module (DM) may include a display panel (DP) and an input sensor (ISS). The display panel (DP) may generate the images. The images generated by the display panel (DP) may be displayed to the front side through the transmission area (TA), and may be viewed by the user from the outside.

The input sensor (ISS) may sense the external input (TC) applied from the outside. The input sensor (ISS) may sense the external input (TC) provided to the cover window (CW).

Referring again to FIG. 22, the display module (DM) may include a flat or substantially flat portion (FN), and a bending portion (BN). The flat portion (FN) may be assembled to be parallel or substantially parallel to a plane defined by the first direction (DR1) and the second direction (DR2). The active area (AA) may be provided at (e.g., in or on) the flat portion (FN).

The bending portion (BN) extends from the flat portion (FN), and at least part of the bending portion (BN) may be bent. The bending portion (BN) may be bent from the flat portion (FN), and may be assembled to be positioned on a rear side of the flat portion (FN). The bending portion (BN) overlaps with the flat portion (FN) in a plan view when assembled, so that the bezel area (BZA) of the display device (DSD) may be reduced. However, the present disclosure is not limited thereto. For example, the bending portion (BN) may be omitted as needed or desired.

The driving circuit (IC) may be mounted on the bending portion (BN). The driving circuit (IC) may be provided as a chip. However, the present disclosure is not limited thereto. The driving circuit (IC) may be provided on an additional circuit board, and may be electrically connected to the display module (DM) through a flexible film.

The driving circuit (IC) may be electrically connected to the active area (AA), and may transmit electrical signals to the active area (AA). For example, the driving circuit (IC) may include a data driving circuit, and may provide data signals to the pixels (PX) disposed at (e.g., in or on) the active area (AA). As another example, the driving circuit (IC) may include a touch driving circuit, and may be electrically connected to the input sensor disposed at (e.g., in or on) the active area (AA). The driving circuit (IC) may be designed to include various suitable kinds of circuits, in addition to or instead of the above-described circuits, and may provide various electrical signals to the active area (AA).

The display device (DSD) may further include a main circuit board electrically connected to the driving circuit (IC). The main circuit board may include various suitable kinds of driving circuits for driving the display module (DM), or a connector for supplying power. The main circuit board may be a rigid printed circuit board (PCB) or a flexible circuit board.

The electronic module (SS) may be disposed at (e.g., in or on) the lower portion of the display module (DM). The electronic module (SS) may receive an external input transmitted through the first area (A1), or may output a signal through the first area (A1). As the first area (A1) may have a relatively high transmittance in the active area (AA), the electronic module (SS) may overlap with the active area (AA), and the area (e.g., size) of the bezel area (BZA) may be reduced.

Referring to FIG. 23, the display device (DSD) may include the display module (DM), a power supply module (e.g., a power supply or a power supply device) (PM), a first electronic module (a first electronic sensor or device) (EM1), and a second electronic module (e.g., a second electronic sensor or device) (EM2). The display module (DM), the power supply module (PM), the first electronic module (EM1), and the second electronic module (EM2) may be electrically connected to each other. FIG. 23 shows a display panel (DP) and an input sensor (ISS) from among the constitutional elements of the display module (DM) as an example.

The power supply module (PM) may supply power for general operations of the display device (DSD). The power supply module (PM) may include a suitable battery module (e.g., a battery).

The first electronic module (EM1) and the second electronic module (EM2) may include various suitable kinds of functional modules for operating the display device (DSD). The first electronic module (EM1) may be mounted on a mother board electrically connected to the display panel (DP), or may be mounted on another substrate and may be electrically connected to the mother board through a connector.

The first electronic module (EM1) may include a control module (e.g., a controller) (CM), a wireless communication module (e.g., a wireless communication device) (TM), an image input module (e.g., an image input device) (IIM), an acoustic input module (e.g., a microphone) (AIM), a memory (MM), and an external interface (IF). Some of the modules may not be mounted on the mother board, and may be electrically connected to the mother board through a flexible circuit board.

The control module (CM) may control general operations of the display device (DSD). The control module (CM) may include (e.g., may be) a microprocessor. For example, the control module (CM) may activate or deactivate the display panel (DP). The control module (CM) may control other modules, such as the image input module (IIM) or the acoustic input module (AIM), based on a touch signal received from the display panel (DP).

The wireless communication module (TM) may transmit/receive wireless signals to/from other terminals by use of a Bluetooth circuit or a WIFI circuit. The wireless communication module (TM) may transmit/receive voice signals by using a general communication circuit. The wireless communication module (TM) includes a transmitter (TM1) for modulating a signal and transmitting the modulated signal, and a receiver (TM2) for demodulating a received signal.

The image input module (IIM) may process image signals, and may convert the same into image data displayable to the display module (DM). The acoustic input module (AIM) may receive external acoustic signals by use of a microphone in a recording mode or a voice recognition mode, and may convert the external acoustic signals into electrical voice data.

The external interface (IF) may function as an interface connected to an external charger, a wire/wireless data port, a card socket (e.g., a memory card or a SIM/UIM card), and/or the like.

The second electronic module (EM2) may include an acoustic output module (e.g., a speaker) (AOM), a light emitting module (e.g., a light source) (LM), a light receiving module (e.g., a light receiving sensor) (LRM), and a camera module (e.g., a camera) (CMM). The second electronic module (EM2) may be mounted on the mother board, may be mounted on an additional substrate and electrically connected to the display module (DM) through a connector, or may be electrically connected to the first electronic module (EM1).

The acoustic output module (AOM) may convert the acoustic data received from the wireless communication module (TM) or the acoustic data stored in the memory (MM), and may output converted data to the outside.

The light emitting module (LM) may generate light, and may output the light. For example, the light emitting module (LM) may output infrared rays. For example, the light emitting module (LM) may include an LED element. For example, the light receiving module (LRM) may sense the infrared rays. The light receiving module (LRM) may be activated when it senses the infrared rays at equal to or greater than a suitable level (e.g., a predetermined level). The light receiving module (LRM) may include a CMOS sensor. The infrared rays generated by the light emitting module (LM) may be output, may be reflected by an external subject (e.g., a finger or a face of a user), and the reflected infrared rays may be input to the light receiving module (LRM). The camera module (CMM) may photograph external images.

The electronic module (SS) may include at least one of the first electronic module (EM1) or the second electronic module (EM2). For example, the electronic module (SS) may include at least one of a camera, a speaker, a light sensor, or a heat sensor. The electronic module (SS) may sense a received external subject through the front side, or may provide a sound signal, such as voice, through the front side. The electronic module (SS) may include a plurality of constitutional elements, and is not limited to any particular embodiment.

Referring again to FIG. 22, the housing (HU) may be combined with (e.g., connected to or attached to) the cover window (CW). The cover window (CW) may be disposed on the front side of the housing (HU). The housing (HU) may be combined with (e.g., connected to or attached to) the cover window (CW) to provide a suitable receiving space (e.g., a predetermined receiving space). The display module (DM) and the electronic module (SS) may be received in the receiving space provided between the housing (HU) and the cover window (CW).

The housing (HU) may include a suitable material with a relatively high rigidity. For example, the housing (HU) may include glass, plastic, or metal, or may include a plurality of frames and/or plates formed of a combination thereof. The housing (HU) may stably protect the constitutional elements of the display device (DSD) that received in the internal space from external impacts.

Figure 24:
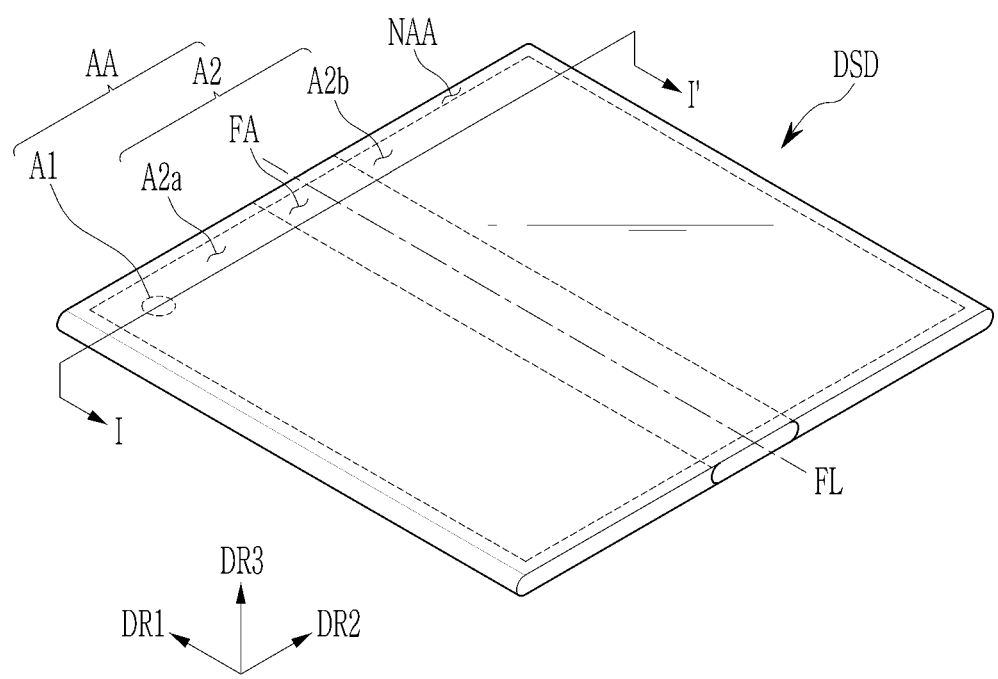
FIG. 24 shows a perspective view of a display device according to an embodiment of the present disclosure.
Figure 25:
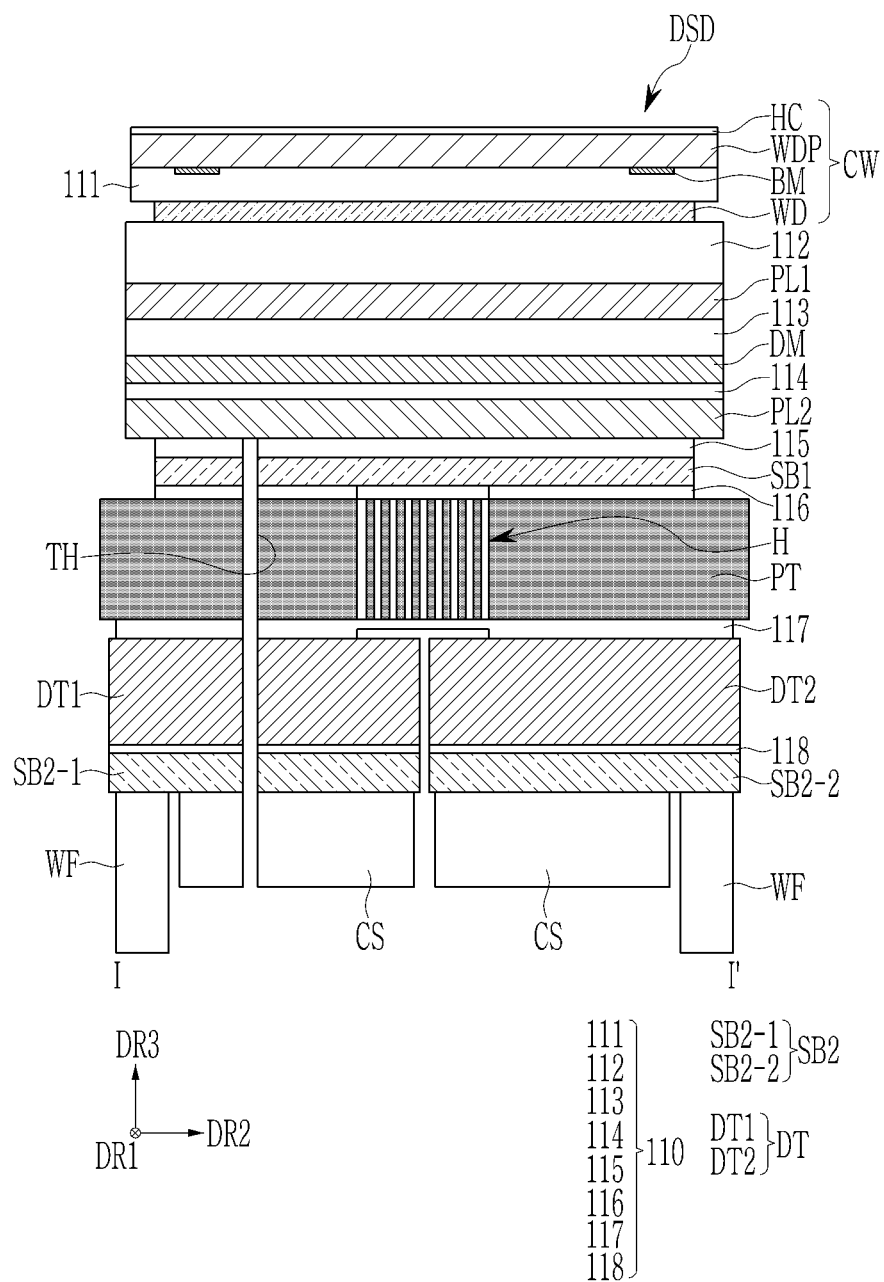
FIG. 25 shows a cross-sectional view of a display device according to an embodiment of the present disclosure.

FIG. 24 shows a perspective view of a display device according to an embodiment of the present disclosure, and FIG. 25 shows a cross-sectional view of a display device according to an embodiment of the present disclosure. FIG. 24 illustrates an example of the display device (DSD) as a foldable display device (DSD), and FIG. 25 illustrates a stacking relationship of the constituent elements or members included in the display device (DSD). FIG. 25 shows a cross-sectional view of the display device (DSD) with respect to (e.g., corresponding to) the line I-I' of FIG. 24.

Referring to FIG. 24, the display device (DSD) may be foldable. For example, the display device (DSD) may be folded with respect to (e.g., relative to or along) a folding axis (FL).

The display device (DSD) may include a housing, a display module (e.g., a display layer), and a cover window.

The display module may include an active area (AA) and a non-active area (NAA). The active area (AA) displays images, and may sense external inputs. A plurality of pixels may be disposed at (e.g., in or on) the active area (AA).

The active area (AA) may include a first area (A1) and a second area (A2). The second area (A2) may include a second-first area (A2a), a second-second area (A2b), and a folding area (FA). The second-first area (A2a) and the second-second area (A2b) may be positioned on a left side and a right side (e.g., according to the orientation shown in the figures) with respect to the folding axis (FL), and the folding area (FA) may be positioned between the second-first area (A2a) and the second-second area (A2b). However, the present disclosure is not limited thereto.

Referring to FIG. 25, the display device (DSD) may include a cover window (CW), a first protecting member (PL1), a display module (e.g., a display layer) (DM), a second protecting member (PL2), a first support member (SB1), a plate (PT), a digitizer (DT), a second support member (SB2), a cushion layer (CS), a waterproof member (WF), and an adhesive layer 110 positioned between the structures. The adhesive layer 110 may include a first adhesive layer 111 to an eighth adhesive layer 118.

The first protecting member (PL1) may be positioned on an upper portion of the display module (DM). The first protecting member (PL1) may be adhered to an upper side of the display module (DM) through the third adhesive layer 113. The third adhesive layer 113 may be a pressure sensitive adhesive (PSA). However, the present disclosure is not limited thereto. The third adhesive layer 113 may be provided with an optically clear adhesive (OCA).

The first protecting member (PL1) may be positioned on the upper portion of the display module (DM) to protect the display module (DM) from external impacts. The first protecting member (PL1) may include (e.g., may be made of) a polymer resin. For example, the polymer resin may include, for example, polyethersulfone, polyacrylate, polyether imide, polyethylene naphthalate, polyethylene terephthalate, polyphenylene sulfide, polyarylate, polyimide, polycarbonate, or cellulose acetate propionate. However, the present disclosure is not limited thereto. The first protecting member (PL1) may include (e.g., may be made of) a suitable material, for example, such as glass or quartz.

The cover window (CW) may be disposed on an upper portion of the first protecting member (PL1). The cover window (CW) may be adhered to the first protecting member (PL1) through the second adhesive layer 112.

The cover window (CW) may include a window (WD), an opaque layer (BM), a window protecting member (WDP), and a hard coating layer (HC). The window (WD) may include (e.g., may be made of) glass. However, the present disclosure is not limited thereto. The window (WD) may include (e.g., may be made of) a polymer resin.

The window protecting member (WDP) may be disposed on an upper portion of the window (WD). The window protecting member (WDP) may be adhered to an upper side of the window (WD) through the first adhesive layer 111. The window protecting member (WDP) may protect the window (WD) from external impacts, and may prevent or substantially prevent the upper side of the window (WD) from being scratched, or may reduce or minimize the scratch. The window protecting member (WDP) may include (e.g., may be made of) a polymer resin. However, the present disclosure is not limited thereto. The window protecting member (WDP) may include (e.g., may be made of) an inorganic material.

The opaque layer (BM) may be provided between the window protecting member (WDP) and the first adhesive layer 111. However, the present disclosure is not limited thereto. The opaque layer (BM) may be provided on part of the window protecting member (WDP). The opaque layer (BM) may include (e.g., may be made of) an opaque material, so that wires and/or circuits of the display module (DM) may not be viewed from the outside. A portion on which the opaque layer (BM) is disposed may be the bezel area (BZA).

The hard coating layer (HC) may be disposed on an upper portion of the window protecting member (WDP). The hard coating layer (HC) may include (e.g., may be made of) an organic material, for example, such as a polymer resin. However, the present disclosure is not limited thereto. The hard coating layer (HC) may include (e.g., may be made of) an inorganic material.

The hard coating layer (HC) may be an outermost layer of the cover window (CW). The outermost layer of the cover window (CW) may represent an outermost layer of the display device (DSD). The outermost layer of the cover window (CW) may be touched by the user, and when the outermost layer of the cover window (CW) is the window (WD) or the window protecting member (WDP), the touch felt by the user may be deteriorated. When the outermost layer of the cover window (CW) is provided as the hard coating layer (HC), however, a smooth and soft touch may be provided to (e.g., felt by) the user.

The second protecting member (PL2) may be disposed on the lower portion of the display module (DM). The second protecting member (PL2) may be adhered to the lower side of the display module (DM) through the fourth adhesive layer 114. The second protecting member (PL2) may be disposed on the lower portion of the display module (DM) to support the display module (DM), and may protect the display module (DM) from external impacts. The second protecting member (PL2) may include (e.g., may be made of) a polymer resin, for example, such as polyethylene terephthalate or polyimide.

The first support member (SB1) may be disposed on a lower portion of the second protecting member (PL2). The first support member (SB1) may be adhered to the second protecting member (PL2) through the fifth adhesive layer 115. The first support member (SB1) may be positioned on the lower portion of the display module (DM), and may support the display module (DM). The first support member (SB1) may include (e.g., may be made of) a polymer resin, for example, such as polyethylene terephthalate or polyimide.

The plate (PT) may be positioned on the lower portion of the first support member (SB1). The plate (PT) may be adhered to the first support member 130 through the sixth adhesive layer 116. The sixth adhesive layer 116 may not be provided in (e.g., installed in) a portion corresponding to the folding area FA (e.g., refer to FIG. 24).

The plate (PT) may be positioned on the lower portion of the display module (DM), and may support the display module (DM). The plate (PT) may be positioned on the upper portion of the digitizer (DT), and may protect the digitizer (DT) from external impacts.

The plate (PT) may include a plurality of holes (H). The plate (PT) may be folded with respect to the folding axis (FL) by the holes (H). In other words, when the display device (DSD) is folded, the plate (PT) may be folded with respect to the folding axis (FL). Other than the holes (H), the plate (PT) may have a flat or substantially flat upper side.

The plate (PT) has been described above with reference to one or more embodiments, and thus, redundant description thereof may be simplified or may not be repeated.

In other words, the plate (PT) may have a stacked structure of isotropic/anisotropic materials. The plate (PT) may include a first layer, a second layer, and a third layer. As an example, the first layer and third layer may be anisotropic, and the second layer may be isotropic. As another example, the first layer and the third layer may be isotropic and the second layer may be anisotropic. As the plate (PT) includes isotropic and anisotropic layers, rigidity of the plate (PT) may be maintained or substantially maintained, while the plate (PT) may be easily folded or bent.

Glass fiber reinforced plastic (GFRP) may be applied as an isotropic material, and carbon fiber reinforced plastic (CFRP) may be applied as an anisotropic material. In the case of the layer including carbon fiber reinforced plastic, the carbon fibers may extend in the first direction that is parallel to or substantially parallel to the folding axis (FL). Therefore, the plate (PT) may have a relatively large elasticity coefficient in the first direction (DR1), and may have a relatively small elasticity coefficient in the second direction (DR2). The plate (PT) may be folded in the second direction (DR2) with respect to the folding axis (FL) extending in the first direction (DR1), so that the rigidity of the plate (PT) may be maintained or substantially maintained, and the plate (PT) may be easily folded.

In other words, the plate (PT) shown in FIG. 25 may be any suitable one of the plates (PT) described above with reference to FIG. 5, FIG. 6, FIG. 9, FIG. 12, FIG. 13, FIG. 14, FIG. 15, or FIG. 16, and is not particularly limited thereto.

The digitizer (DT) may be disposed on the lower portion of the plate (PT). The digitizer (DT) may be adhered to the lower portion of the plate (PT) through the seventh adhesive layer 117. The seventh adhesive layer 117 may be positioned on the lower portion of the plate (PT), and may prevent or substantially prevent foreign particles from being introduced into the holes (H) of the plate (PT), or may reduce or minimize such foreign particles from being introduced.

The digitizer (DT) may include a body layer and/or a pattern layer. The digitizer (DT) may sense signals that are input from an electronic pen through the pattern layer. For example, the digitizer (DT) may sense an intensity and a direction of the signals that are input by the electronic pen, and/or the like.

When the digitizer (DT) is integrally provided, and the display device (DSD) is folded, the body layer and/or the pattern layer of the digitizer (DT) may be cracked. The digitizer (DT) may include a first digitizer (DT1) positioned on a left with respect to the folding axis (FL), and a second digitizer (DT2) positioned on a right with respect to the folding axis (FL). The first digitizer (DT1) may overlap with at least a part of the second-first area (A2a) shown FIG. 24, and the second digitizer (DT2) may overlap with at least part of the second-second area (A2b). The first digitizer (DT1) may overlap with at least part of the folding area FA, and the second digitizer (DT2) may overlap with at least part of the folding area FA (e.g., refer to FIG. 24).

The first digitizer (DT1) and the second digitizer (DT2) may be spaced from each other in the second direction (DR2) with the folding axis (FL) therebetween. In other words, the digitizer (DT) may include a separated structure, and not an integrated structure. As the digitizer (DT) has the separated structure, a crack in the body layer and/or the pattern layer disposed in the folding area (FA) may be prevented or substantially prevented from being formed, or a size of the crack may be reduced or minimized.

In addition, the digitizer (DT) having the separated structure overlaps with at least part of the folding area FA (e.g., refer to FIG. 24), so that it may receive signals in the folding area (FA), thereby improving a convenience of the user.

The second support member (SB2) may be disposed on the lower portion of the digitizer (DT). The second support member (SB2) may be adhered to the lower side of the digitizer (DT) through the eighth adhesive layer 118. The eighth adhesive layer 118 may not be provided to a portion that corresponds to the folding area FA (e.g., refer to FIG. 24).

The second support member (SB2) may transmit heat generated by the digitizer (DT) to the outside. In this case, the second support member (SB2) may include a metal having excellent heat transmission efficiency. As another example, the second support member (SB2) may include (e.g., may be made of) graphite having high thermal conductivity in a planar direction. When the second support member (SB2) including graphite is provided, the second support member (SB2) may be thinner than the second support member (SB2) including a metal. The second support member (SB2) may be disposed on the lower portion of the digitizer (DT) to support the digitizer (DT), and may protect the digitizer (DT) from external impacts.

The second support member (SB2) may include a second-first support member (SB2-1) positioned on the left with respect to the folding axis (FL), and a second-second support member (SB2-2) positioned on the right of the folding axis (FL).

A cushion layer (CS) may be disposed on the lower portion of the second support member (SB2). The cushion layer (CS) may prevent or substantially prevent the digitizer (DT) disposed on the cushion layer (CS) from being damaged by external impacts, or may reduce or minimize the damage. The cushion layer (CS) may include a pressure sensitive adhesive.

The waterproof member (WF) may be disposed at (e.g., in or on) an outside of the cushion layer (CS). The waterproof member (WF) may block or absorb moisture input from the outside of the display device (DSD), to prevent or substantially prevent the constitutional elements of the display device (DSD) from being damaged by the moisture, or to reduce or minimize the damage. A tape or a sponge may be provided as the waterproof member (WF).

One or more through-holes (TH) corresponding to the first area (A1) (e.g., see FIG. 24) may penetrate the fifth adhesive layer 115, the first support member (SB1), the sixth adhesive layer 116, the plate (PT), the seventh adhesive layer 117, the digitizer (DT), the eighth adhesive layer 118, the second support member (SB2), and the cushion layer (CS). However, the present disclosure is not limited thereto. For example the through-hole (TH) may not penetrate at least one of the fifth adhesive layer 115, the first support member (SB1), the sixth adhesive layer 116, the plate (PT), the seventh adhesive layer 117, the digitizer (DT), the eighth adhesive layer 118, the second support member (SB2), or the cushion layer (CS). In some embodiments, the through-hole (TH) may additionally penetrate the second protecting member (PL2).

As the through-holes (TH) corresponding to the first area (A1) penetrate through (e.g., are disposed in) the fifth adhesive layer 115, the first support member (SB1), the sixth adhesive layer 116, the plate (PT), the seventh adhesive layer 117, the digitizer (DT), the eighth adhesive layer 118, the second support member (SB2), and the cushion layer (CS), light transmittance of the first area (A1) may be improved, and the display device with a performance improved electronic module (SS) may be provided.

Figure 26:
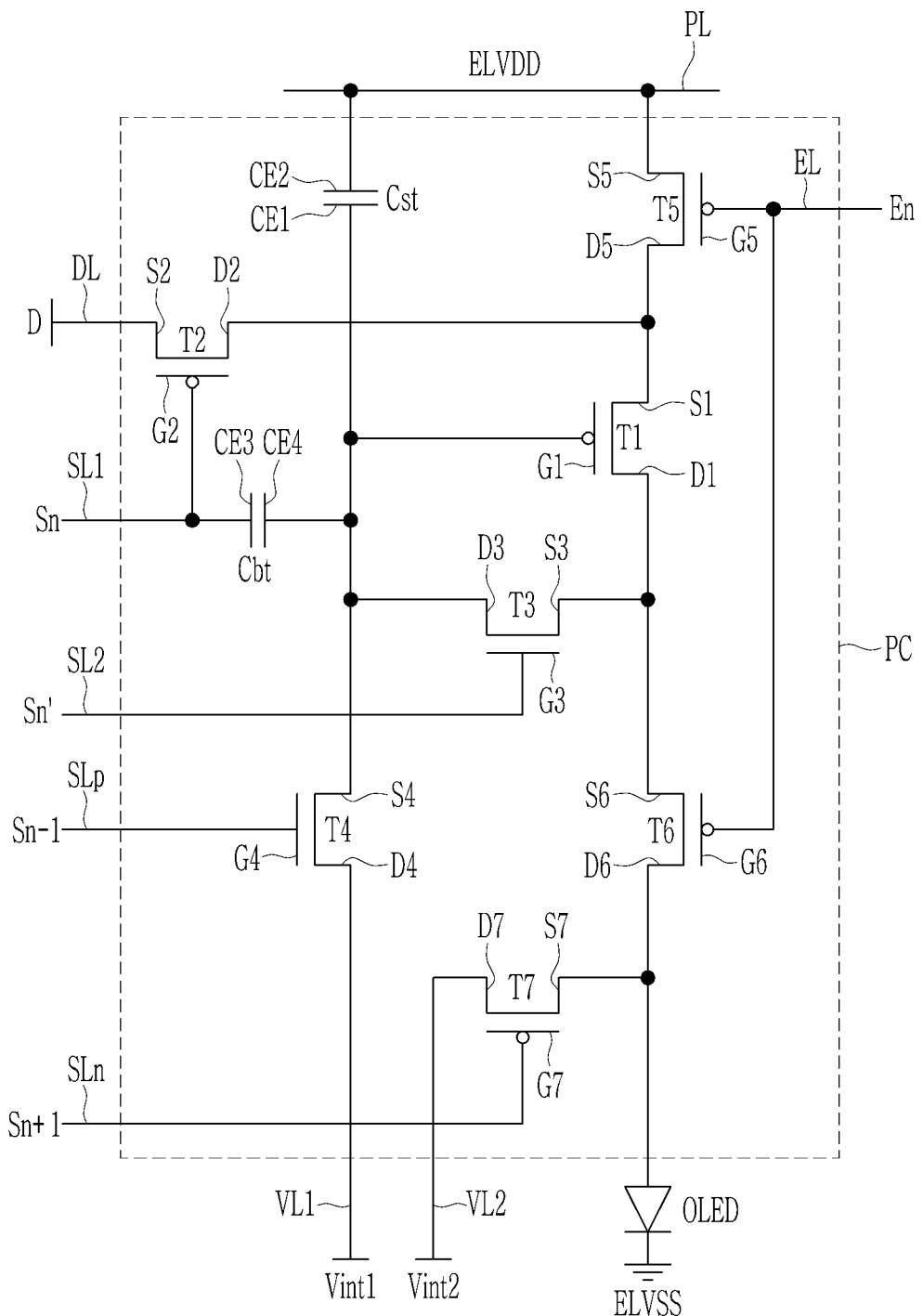
FIG. 26 shows an equivalent circuit diagram of a pixel according to an embodiment of the present disclosure.

FIG. 26 shows an equivalent circuit diagram of a pixel according to an embodiment of the present disclosure. For example, FIG. 26 illustrates an equivalent circuit diagram of a pixel (PX) included in the display module DM (e.g., refer to FIG. 22). The equivalent circuit diagram of the pixel (PX) shown in FIG. 26 has a size difference, and may be applied to a second pixel (e.g., a main pixel) disposed in the second area (A2), as well as a first pixel (e.g., an auxiliary pixel) disposed in the first area (A1).

Referring to FIG. 26, the pixel (PX) may include a pixel circuit (PC), and a light emitting device (OLED) connected to the pixel circuit (PC). The pixel circuit (PC) may include a first transistor (T1), a second transistor (T2), a third transistor (T3), a fourth transistor (T4), a fifth transistor (T5), a sixth transistor (T6), a seventh transistor (T7), a first storage capacitor (Cst), and a second storage capacitor (Cbt). However, the present disclosure is not limited thereto, and at least one of the first to seventh transistors (T1 to T7) may be omitted as needed or desired.

The first to seventh transistors (T1, T2, T3, T4, T5, T6, and T7) and the first and second storage capacitors (Cst and Cbt) may be connected to various signal lines, a first initialization voltage line (VL1), a second initialization voltage line (VL2), and a driving voltage line (PL). The signal lines may include a data line (DL), a first scan line (SL1), a second scan line (SL2), a previous scan line (SLp), a posterior scan line (SLn), and an emission control line (EL). The signal lines, the first and second initialization voltage lines (VL1 and VL2), and/or the driving voltage line (PL) may be shared by neighboring pixels (e.g., by adjacent pixels).

The driving voltage line (PL) may transmit a first power voltage (ELVDD) to the first transistor (T1). The first initialization voltage line (VL1) may transmit a first initialization voltage (Vint1) for initializing the first transistor (T1) to the pixel circuit (PC). The second initialization voltage line (VL2) may transmit a second initialization voltage (Vint2) for initializing the light-emitting device (OLED) to the pixel circuit (PC).

The third transistor (T3) and the fourth transistor (T4) from among the first to seventh transistors (T1 to T7) may be realized with n-channel MOSFET (NMOS) transistors, and the rest of the transistors (e.g., T1-T2 and T5-T7) may be realized with p-channel MOSFET (PMOS) transistors. However, the present disclosure is not limited thereto.

As used in the present specification, the phrase "electrically connected between a transistor and a signal line" or "electrically connected between a transistor and a transistor" may represent that a source, a drain, or a gate of a transistor may have an integral shape with a corresponding signal line, or is connected thereto through a connection electrode.

The first transistor (T1) may control a driving current that flows to the light-emitting device (OLED) from the driving voltage line (PL) according to a gate voltage. The first transistor (T1) may include a gate (G1) connected to a first electrode (CE1) of the first storage capacitor (Cst), and a source (S1) connected to the driving voltage line (PL) through the fifth transistor (T5). The first transistor (T1) may include a drain (D1) connected to the light-emitting device (OLED) through the sixth transistor (T6).

The second transistor (T2) may receive a data voltage (D) in response to a first scan signal (Sn) applied to the first scan line (SL1). The second transistor (T2) may transmit the data voltage (D) to the source (S1) of the first transistor (T1) in response to the first scan signal (Sn). The second transistor (T2) may include a gate (G1) connected to the first scan line (SL1), a source (S2) connected to the data line (DL), and a drain (D2) connected to the source (S1) of the first transistor (T1).

The first storage capacitor (Cst) may be connected between the driving voltage line (PL) and the first transistor (T1). The first storage capacitor (Cst) may include a second electrode (CE2) connected to the driving voltage line (PL), and the first electrode (CE1) connected to the gate (G1) of the first transistor (T1). The first storage capacitor (Cst) may store a difference between the first driving voltage (ELVDD) applied to the driving voltage line (PL) and the gate voltage of the first transistor (T1), and may maintain or substantially maintain the gate voltage of the first transistor (T1).

The third transistor (T3) may be connected (e.g., coupled in series) between the drain (D1) and the gate (G1) of the first transistor (T1), and may connect the drain (D1) and the gate (G1) of the first transistor (T1) to each other in response to a second scan signal (Sn'). The third transistor (T3) may include a gate (G3) connected to the second scan line (SL2), a source (S3) connected to the drain (D1) of the first transistor (T1), and a drain (D3) connected to the gate (G1) of the first transistor (T1). In some embodiments, the third transistor (T3) may be configured with a plurality of transistors that are connected to (e.g., coupled to) each other in series between the drain (D1) and the gate (G1) of the first transistor (T1), and controlled (e.g., concurrently controlled) by the second scan signal (Sn') or the first scan signal (Sn). However, the present disclosure is not limited thereto, and the third transistor (T3) may be omitted as needed or desired.

When the third transistor (T3) is turned on in response to the second scan signal (Sn'), the drain (D1) and the gate (G1) of the first transistor (T1) may be connected to each other such that the first transistor (T1) may be diode-connected.

The fourth transistor (T4) may apply the first initialization voltage (Vint1) to the gate (G1) of the first transistor (T1) in response to a previous scan signal (Sn−1). The fourth transistor (T4) may include a gate (G4) connected to the previous scan line (SLp), a source (S4) connected to the gate (G1) of the first transistor (T1), and a drain (D4) connected to the first initialization voltage line (VL1). The fourth transistor (T4) may be configured with a plurality of transistors that are connected to (e.g., coupled to) each other in series, and controlled (e.g., concurrently controlled) by the previous scan signal (Sn−1). However, the present disclosure is not limited thereto, and the fourth transistor (T4) may be omitted as needed or desired.

The fifth transistor (T5) may connect the driving voltage line (PL) and the source (S1) of the first transistor (T1) to each other in response to an emission control signal (En). The fifth transistor (T5) may include a gate (G5) connected to the emission control line (EL), a source (S5) connected to the driving voltage line (PL), and a drain (D5) connected to the source (S1) of the first transistor (T1). However, the present disclosure is not limited thereto, and the fifth transistor (T5) may be omitted as needed or desired.

The sixth transistor (T6) may connect the drain (D1) of the first transistor (T1) and an anode of the light-emitting device (OLED) to each other in response to the emission control signal (En). The sixth transistor (T6) may transmit the driving current output by the first transistor (T1) to the anode of the light-emitting device (OLED). The sixth transistor (T6) may include a gate (G6) connected to the emission control line (EL), a source (S6) connected to the drain (D1) of the first transistor (T1), and a drain (D6) connected to the anode of the light-emitting device (OLED). However, the present disclosure is not limited thereto, and the sixth transistor (T6) may be omitted as needed or desired.

The seventh transistor (T7) may apply the second initialization voltage (Vint2) to the anode of the light-emitting device (OLED) in response to a posterior scan signal (Sn+1). The seventh transistor (T7) may include a gate (G7) connected to the posterior scan line (SLn), a source (S7) connected to the anode of the light-emitting device (OLED), and a drain (D7) connected to the second initialization voltage line (VL2). However, the present disclosure is not limited thereto, and the seventh transistor (T7) may be omitted as needed or desired.

The seventh transistor (T7) may be connected to the posterior scan line (SLn) as shown in FIG. 26. In another embodiment, the seventh transistor (T7) may be connected to the emission control line (EL), and may be driven according to the emission control signal (En). In another embodiment, the seventh transistor (T7) may be connected to the previous scan line (SLp), and may be driven according to the previous scan signal (SLp).

Positions of the sources and the drains of the transistors (T1-T7) may be switched according to the kind (e.g., p-type or n-type) of the transistors.

The second storage capacitor (Cbt) may include a third electrode (CE3) and a fourth electrode (CE4). The fourth electrode (CE4) of the second storage capacitor (Cbt) may be connected to the first electrode (CE1) of the first storage capacitor (Cst), and the third electrode (CE3) of the second storage capacitor (Cbt) may receive the first scan signal (Sn). The second storage capacitor (Cbt) may compensate for a voltage drop at the gate terminal (G1) of the first transistor (T1) by increasing the voltage at the gate terminal (G1) when the providing of the first scan signal (Sn) stops. However, the present disclosure is not limited thereto, and the second storage capacitor (Cbt) may be omitted as needed or desired.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

| Description of symbols | |
| --- | --- |
| DM: display module | PT: plate |
| CF: carbon fiber | GF: glass fiber |
| DSD: display device | DSP: display panel |
| FA: folding area | NFA: peripheral folding area |
| H: hole | TH: through hole |

What is claimed is:

1. A display device comprising:
   a display module;
   a plate attached to the display module; and
   a digitizer on a lower portion of the plate, and configured to sense a touch, wherein the plate is multi-layered, and comprises:
      a layer with an isotropic elasticity coefficient and located above the digitizer; and
      a layer with an anisotropic elasticity coefficient and located above the digitizer.

2. The display device of claim 1, wherein the layer with the anisotropic elasticity coefficient of the plate comprises carbon fiber reinforced plastic, the carbon fiber reinforced plastic comprising carbon fibers extending in one direction.

3. The display device of claim 1, wherein the layer with the anisotropic elasticity coefficient of the plate has a difference between an elasticity coefficient in a first direction and an elasticity coefficient in a second direction that is perpendicular to the first direction of 2 to 20 times from each other.

4. The display device of claim 1, wherein the layer with the isotropic elasticity coefficient of the plate comprises glass fiber reinforced plastic comprising glass fibers that are regularly arranged.

5. The display device of claim 1, wherein the plate comprises:
   a first layer;
   a second layer; and
   a third layer, and
   wherein the first layer and the third layer include the same material as each other and have the anisotropic elasticity coefficient, and the second layer has the isotropic elasticity coefficient.

6. The display device of claim 5, further comprising:
   a first auxiliary layer contacting the first layer, and located on a first outermost side of the plate; and
   a second auxiliary layer contacting the third layer, and located on a second outermost side of the plate opposite the first outermost side, and
   wherein the first auxiliary layer and the second auxiliary layer comprise one or more metals.

7. The display device of claim 5, further comprising:
   a first auxiliary layer located between the first layer and the second layer; and a second auxiliary layer located between the third layer and the second layer, and wherein the first auxiliary layer and the second auxiliary layer comprise one or more metals.

8. The display device of claim 1, wherein the plate comprises:
a first layer;
a second layer; and
a third layer, and
wherein the first layer and the third layer include the same material as each other and have the isotropic elasticity coefficient, and the second layer has the anisotropic elasticity coefficient.

9. The display device of claim 8, further comprising:
a first auxiliary layer contacting the first layer, and located on a first outermost side of the plate; and
a second auxiliary layer contacting the third layer, and located on a second outermost side of the plate opposite the first outermost side, and
wherein the first auxiliary layer and the second auxiliary layer comprise one or more metals.

10. The display device of claim 8, further comprising:
a first auxiliary layer located between the first layer and the second layer; and
a second auxiliary layer located between the third layer and the second layer, and
wherein the first auxiliary layer and the second auxiliary layer comprise one or more metals.

11. The display device of claim 1, wherein a thickness of the plate is 150 μm to 250 μm.

12. The display device of claim 1, wherein a thickness of the layer with the anisotropic elasticity coefficient of the plate is 100 μm to 150 μm.

13. The display device of claim 1, wherein a thickness of the layer with the isotropic elasticity coefficient of the plate is 10 μm to 50 μm.

14. The display device of claim 1, wherein the display device is configured to be folded relative to a folding axis.

15. The display device of claim 14, wherein the plate comprises:
a folding area overlapping with the folding axis, and having a plurality of holes; and
a peripheral folding area that does not overlap with the folding axis.

16. The display device of claim 15, wherein the folding area and the peripheral folding area are configured to be bent in opposite directions from each other.

17. The display device of claim 14, wherein the layer with the anisotropic elasticity coefficient of the plate has an elasticity coefficient that is perpendicular to the folding axis and an elasticity coefficient that is parallel to the folding axis, and
wherein the elasticity coefficient that is perpendicular to the folding axis is less than the elasticity coefficient that is parallel to the folding axis.

18. A display device comprising:
a display module;
a plate attached to the display module; and
a digitizer on a lower portion of the plate,
wherein the plate is multi-layered, and comprises:
a layer with an isotropic elasticity coefficient; and
a layer with an anisotropic elasticity coefficient,
wherein the display device is configured to be folded relative to a folding axis,
wherein the layer with the anisotropic elasticity coefficient of the plate has an elasticity coefficient that is perpendicular to the folding axis and an elasticity coefficient that is parallel to the folding axis,
wherein the elasticity coefficient that is perpendicular to the folding axis is less than the elasticity coefficient that is parallel to the folding axis, and
wherein the layer with the anisotropic elasticity coefficient of the plate has a difference between the elasticity coefficient that is perpendicular to the folding axis and the elasticity coefficient that is parallel to the folding axis of 1.5 to 6 times from each other.

19. A foldable display device comprising:
a display module configured to be folded in a folding direction relative to a folding axis extending in a display area; and
a plate attached to the display module and overlapping with the folding axis,
wherein an elasticity coefficient of the plate in a direction that is perpendicular to the folding axis is less than an elasticity coefficient of the plate in a direction that is parallel to the folding axis, and
wherein the plate is configured to be bent at a peripheral folding area adjacent to the folding axis in a direction opposite to that of the folding direction.

20. The foldable display device of claim 19, wherein the plate has a multilayered structure, and comprises:
a carbon fiber reinforced plastic layer comprising carbon fibers extending in one direction; and
a glass fiber reinforced plastic layer comprising glass fibers that are arranged in a regular direction.

21. The foldable display device of claim 19, wherein the plate comprises:
a first layer;
a second layer; and
a third layer, and
wherein:
the first layer and the third layer have anisotropic elasticity coefficients, and the second layer has an isotropic elasticity coefficient; or
the first layer and the third layer have isotropic elasticity coefficients, and the second layer has an anisotropic elasticity coefficient.

22. The foldable display device of claim 19, wherein the plate comprises:
a folding area overlapping with the folding axis, and having a plurality of holes; and
a peripheral folding area that does not overlap with the folding axis, and having a uniform thickness.

23. The foldable display device of claim 22, wherein the folding area and the peripheral folding area of the plate are configured to be bent in opposite directions from each other.

24. The foldable display device of claim 19, further comprising:
a cover window on the display module; and
a digitizer located below the plate, and comprising:
a first digitizer located at a left side relative to the folding axis; and
a second digitizer located at a right side relative to the folding axis.

* * * * *